(12) United States Patent
Ishiyama

(10) Patent No.: US 8,699,788 B2
(45) Date of Patent: Apr. 15, 2014

(54) INTRODUCTION SYSTEM, METHOD OF INTRODUCTION, AND INTRODUCTION PROGRAM

(75) Inventor: Rui Ishiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 357 days.

(21) Appl. No.: 13/131,789

(22) PCT Filed: Nov. 19, 2009

(86) PCT No.: PCT/JP2009/006221
§ 371 (c)(1),
(2), (4) Date: May 27, 2011

(87) PCT Pub. No.: WO2010/064371
PCT Pub. Date: Jun. 10, 2010

(65) Prior Publication Data
US 2011/0229016 A1    Sep. 22, 2011

(30) Foreign Application Priority Data

Dec. 1, 2008  (JP) .................................. 2008-306630

(51) Int. Cl.
*G06K 9/00* (2006.01)
*G06Q 10/00* (2012.01)
*G06E 1/00* (2006.01)

(52) U.S. Cl.
USPC ............. 382/159; 382/100; 705/7.17; 706/21

(58) Field of Classification Search
USPC ................. 382/100, 155, 159, 190, 305, 312; 705/319, 320, 321, 7.14, 1.1, 7.17; 707/705, 999, 1, 3, 999.104, E17.014, 707/E17.059, 999.006, 999.102, 947, 942, 707/999.001; 709/201, 227, 220; 379/93.12; 358/1.9; 706/21, 12, 14
See application file for complete search history.

(56) References Cited

U.S. PATENT DOCUMENTS 6,718,345 B2 *  4/2004  Hartman et al. ...................... 1/1
7,016,853 B1 *  3/2006  Pereless et al. ................. 705/1.1
(Continued)

FOREIGN PATENT DOCUMENTS

JP    2001-092737 A    4/2001
JP    2003-150528 A    5/2003
JP    2008-040607 A    2/2008

OTHER PUBLICATIONS

Shinpei Masuda, et al., "Study of Individual Preference Identification to Face Image with Subjective Meta Information", IEICE Technical Report, Mar. 2008, pp. 283-288, vol. 107, No. 542.

(Continued)

*Primary Examiner* — Sheela Chawan
(74) *Attorney, Agent, or Firm* — Sughrue Mion, PLLC

(57) ABSTRACT

An introduction system is capable of identifying, with a high degree of precision, applicants who fulfill recruiter's requirements. An applicant identification unit 81 identifies applicants who satisfy minimum criteria on the basis of images input by applicants and a threshold image set for use in discriminating the minimum criteria for determining whether a recruiter is satisfied. A notification unit 82 notifies the recruiter of the applicants identified by the applicant identification unit 81. The introduction system may further include a threshold image set determination unit that determines the threshold image set on the basis of a result of a determination made by the recruiter on whether a sample image set prepared as samples fulfill the recruiter's requirements.

15 Claims, 9 Drawing Sheets

(56) References Cited

U.S. PATENT DOCUMENTS

| | | | |
|---|---|---|---|
| 7,496,518 B1 * | 2/2009 | Cayton et al. | 705/321 |
| 7,505,919 B2 * | 3/2009 | Richardson | 705/7.14 |
| 7,711,573 B1 * | 5/2010 | Obeid | 705/321 |
| 7,805,382 B2 * | 9/2010 | Rosen et al. | 705/321 |
| 7,945,522 B2 * | 5/2011 | McGovern et al. | 705/320 |

OTHER PUBLICATIONS

Atsushi Sato, et al., "Character Recognition using Generalized Learning Vector Quantization", Technical Report of IEICE, Mar. 1996, pp. 23-30.

* cited by examiner ced, for example, in Patent Literature 1. In the system
INTRODUCTION SYSTEM, METHOD OF INTRODUCTION, AND INTRODUCTION PROGRAM

CROSS REFERENCE TO RELATED APPLICATIONS

This application is a National Stage of International Application No. PCT/JP2009/006221 filed Nov. 19, 2009, claiming priority based on Japanese Patent Application No. 2008-306630, filed Dec. 1, 2008, the contents of all of which are incorporated herein by reference in their entirety.

TECHNICAL FIELD

The present invention relates to an introduction system, a method of introduction, and an introduction program that are capable of identifying applicants who fulfill recruiter's requirements and introducing the applicants to a recruiter, a threshold image set generation system and a threshold image set generation program that determine a threshold image set for use in discriminating minimum criteria for determining whether the recruiter is satisfied, and an agreement possibility decision system and an agreement possibility decision program that decide the possibility of an agreement between the recruiter and the applicants.

BACKGROUND ART

A system for introducing applicants to a recruiter is disclosed, for example, in Patent Literature 1. In the system disclosed in Patent Document 1, a server that stores a plurality of predetermined face images along with type names transmits a plurality of face image data and the type names of the respective face images to a recruiter user terminal and registers required types that the recruiter user requires. Upon receiving the applicant information and the face images from applicant user terminals, the server decides to which type each of the face images belongs and transmits the applicant information and the applicant face image to a recruiter user whose required type matches the type of the face image of the applicant user.

In the above system, the type required by the recruiter is previously determined and the recruiter is notified of applicants who satisfy the recruiter's requirements. As a similar system, there can be a system that calculates the degree of similarity between a face image required by a recruiter and the face image of an applicant and transmits the face image of the applicant to the recruiter when the degree of similarity is high.

Further, Non-Patent Literature 1 discloses a handwritten character recognition method using generalized learning vector quantization (GLVQ), which is a generalization of learning vector quantization (LVQ).

CITATION LIST

Patent Literature

PTL 1: Japanese Patent Application Laid-Open No. 2008-40607

Non Patent Literature

NPL 1: "Character Recognition using Generalized Learning Vector Quantization" by Atsushi Sato and Keiji Yamada, Technical Report of IEICE, PRU95-219, March 1996, pp. 23-30

SUMMARY OF INVENTION

Technical Problem

In the system that calculates the degree of similarity between the face image required by the recruiter and the face image of the applicant, whether to introduce the applicant to the recruiter is determined according to whether the degree of similarity between the face image required by the recruiter and the face image of the applicant satisfies criteria. The system, however, has a problem that it is difficult to determine the criteria appropriately. The criteria for determining to what extent the face image of the applicant should be similar to the required face image vary according to an individual recruiter, and therefore it is difficult to determine the criteria including a threshold value with uniformity.

Even in the case where a certain threshold value is determined as the criteria and the face image of an applicant is transmitted to the recruiter when the degree of similarity exceeds the threshold value, the threshold value, if not matching the recruiter's senses, may cause the recruiter to feel that applicants who do not fulfill the recruiter's requirements are introduced in addition to applicants who fulfill the recruiter's requirements. If so, the introduction of the applicants who do not fulfill the requirements increases the labor hours for the recruiter to deal with the introduction.

In addition, it is also conceivable that the recruiter obtains the degree of similarity to the face image required by the recruiter with respect to the respective face images of the applicants and only an applicant having the highest degree of similarity (or only top applicants within a given rank order) is introduced to the recruiter. The image required by the recruiter, however, is often ideal and provided with the most favorable conditions. Further, it is hard to match the calculation of the degree of similarity by the computer with the human senses, which therefore makes it impossible to discriminate the minimum requirements. This causes too strict discrimination requirements and thus decreases the number of applicants to be introduced to the recruiter or conversely causes an introduction of applicants not satisfying the minimum conditions to the recruiter. Therefore, it is difficult to satisfy the minimum criteria for the recruiter's satisfaction and thus the number of applicants to be introduced decreases. This results in a less-satisfactory system for both of the recruiter and the applicants.

Therefore, it is an exemplary object of the present invention to provide an introduction system, a method of introduction, and an introduction program that are capable of identifying, with a high degree of precision, applicants who fulfill the recruiter's requirements. Another object of the present invention is to provide a threshold image set generation system and a threshold image set generation program that determine a threshold image set for use in discriminating, with a high degree of precision, applicants who fulfill the recruiter's requirements. A further object of the present invention is to provide an agreement possibility decision system and an agreement possibility decision program that decide the possibility of an agreement between the recruiter and the applicants.

Solution to Problem

An introduction system according to an exemplary aspect of the invention includes:

an applicant identification unit that identifies applicants who satisfy minimum criteria on the basis of images input by applicants and a threshold image set for use in discriminating the minimum criteria for determining whether a recruiter is satisfied; and a notification unit that notifies the recruiter of the applicants identified by the applicant identification unit.

A threshold image set generation system according to an exemplary aspect of the invention includes: an input unit that receives an input of a result of a determination made by a recruiter on whether a sample image set prepared as samples fulfills recruiter's requirements; a threshold image set determination unit that determines a threshold image set for use in discriminating minimum criteria for determining whether the recruiter is satisfied on the basis of the result of the determination; and an output unit that outputs the threshold image set.

An agreement possibility decision system according to an exemplary aspect of the invention includes: an inter-image distance calculation unit that calculates a distance between each image belonging to a threshold image set for use in discriminating minimum criteria for determining whether a recruiter is satisfied and the image of an applicant; and a satisfaction level calculation unit that calculates a satisfaction level representing to what extent the applicant satisfies or does not satisfy the minimum criteria on the basis of the distance.

A method of introduction according to an exemplary aspect of the invention includes: identifying applicants who satisfy minimum criteria on the basis of images input by applicants and a threshold image set for use in discriminating the minimum criteria for determining whether a recruiter is satisfied; and notifying the recruiter of the identified applicants.

An introduction program according to an exemplary aspect of the invention causes a computer to perform:

an applicant identification process of identifying applicants who satisfy minimum criteria on the basis of images input by applicants and a threshold image set for use in discriminating the minimum criteria for determining whether a recruiter is satisfied; and a notification process of notifying the recruiter of the applicants identified in the applicant identification process.

A threshold image set generation program according to an exemplary aspect of the invention causes a computer to perform: an input receiving process of receiving an input of a result of a determination made by a recruiter on whether a sample image set prepared as samples fulfills recruiter's requirements; a threshold image set determination process of determining a threshold image set for use in discriminating minimum criteria for determining whether the recruiter is satisfied on the basis of the result of the determination; and an output process of outputting the threshold image set.

An agreement possibility decision program according to an exemplary aspect of the invention causes a computer to perform: an inter-image distance calculation process of calculating a distance between each image belonging to a threshold image set for use in discriminating minimum criteria for determining whether a recruiter is satisfied and the image of an applicant; and a satisfaction level calculation process of calculating a satisfaction level representing to what extent the applicant satisfies or does not satisfy the minimum criteria on the basis of the distance.

Advantageous Effects of Invention

According to the present invention, it is possible to identify, with a high degree of precision, applicants who fulfill the recruiter's requirements.

DESCRIPTION OF EMBODIMENT

Hereinafter, preferred embodiments of the present invention will be described with reference to accompanying drawings. In what follows, the description will be given taking, as an example, a case of introducing applicants who fulfill the recruiter's requirements in terms of appearance (assumed to be a face, here) to a recruiter.

First Exemplary Embodiment

Figure 1:
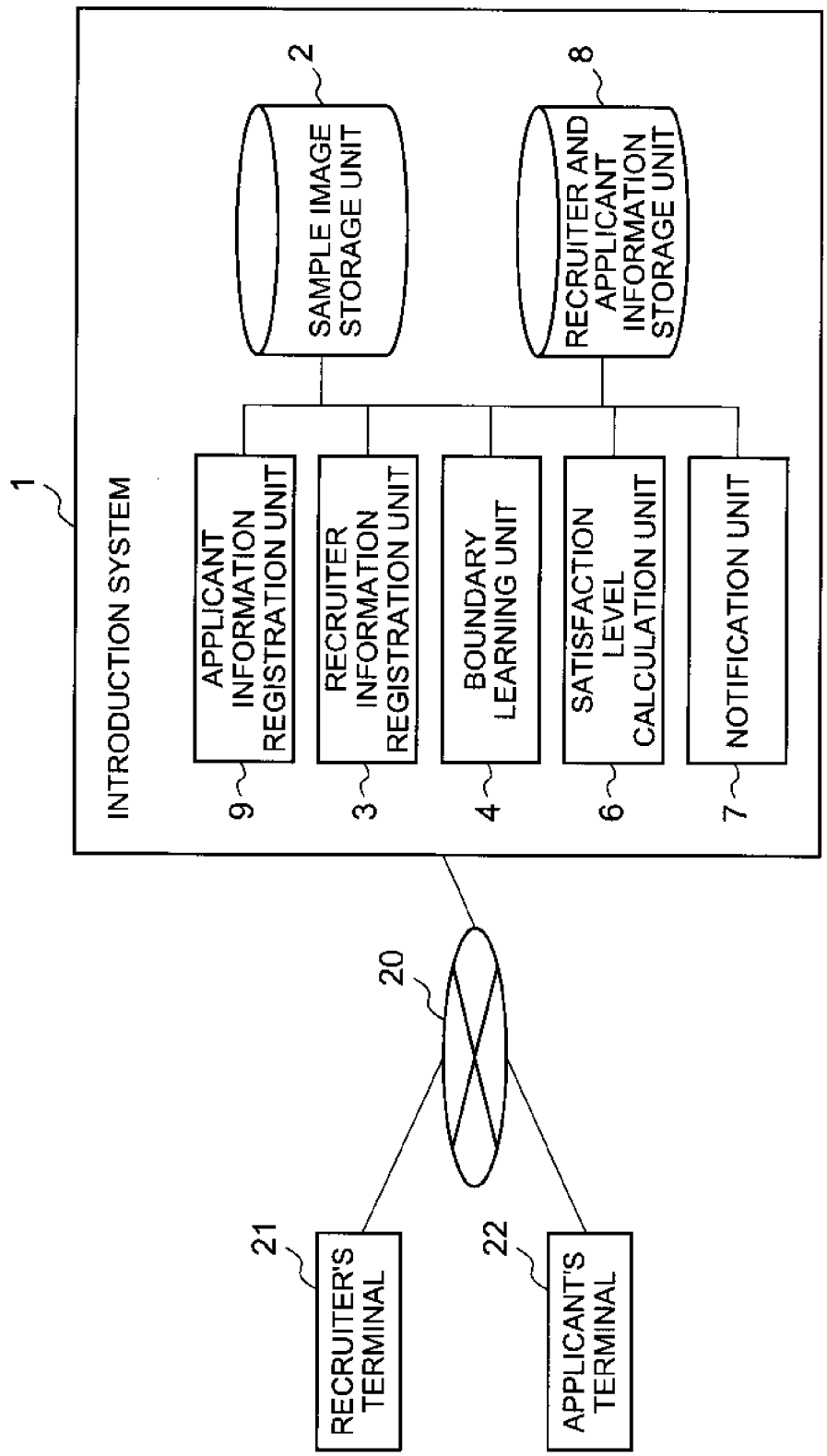
[FIG. 1] It depicts a block diagram illustrating an example of an introduction system according to a first exemplary embodiment of the present invention.

FIG. 1 is a block diagram illustrating an example of an introduction system according to a first exemplary embodiment of the present invention. The introduction system 1 of this exemplary embodiment includes a sample image storage unit 2, a recruiter and applicant information storage unit 8, a recruiter information registration unit 3, an applicant information registration unit 9, a boundary learning unit 4, a satisfaction level calculation unit 6, and a notification unit 7.

Moreover, the introduction system 1 is connected to a recruiter's terminal 21 and an applicant's terminal 22 via a communication network 20. The recruiter's terminal 21 is a terminal used by a recruiter and the applicant's terminal 22 is a terminal used by an applicant. As an example of the communication network 20, there is the Internet, for example, but the communication network 20 is not limited to the Internet.

The sample image storage unit 2 is a storage device that stores a plurality of sample images (sample image set). The sample image is an image of an appearance prepared as a sample. In this exemplary embodiment, the sample image is a face image. The recruiter makes determination on whether each of the plurality of sample images fulfills the recruiter's requirements. Thereafter, a result of the recruiter's determination on each sample image is used to determine an image set for use in discriminating whether the face image of the applicant fulfills the recruiter's requirements.

The recruiter and applicant information storage unit 8 is a storage device that stores information on recruiters and applicants. The recruiter and applicant information storage unit 8 stores, as information on a recruiter, an address or the like of the recruiter's terminal 21 and a result of a determination on whether the face represented by each sample image fulfills the recruiter's requirements, for example. Moreover, the recruiter and applicant information storage unit 8 stores the face image of an applicant as information on the applicant.

The recruiter information registration unit 3 transmits each sample image stored in the sample image storage unit 2 to the recruiter's terminal 21 and receives a result of the determination made by the recruiter on whether each sample image fulfills the recruiter's requirements from the recruiter's terminal 21. Further, the recruiter information registration unit 3 causes the result of the determination to be stored in the recruiter and applicant information storage unit 8. In addition, the recruiter information registration unit 3 causes the address or the like of the recruiter's terminal 21 to be stored in the recruiter and applicant information storage unit 8.

Upon receiving the face image of the applicant from the applicant's terminal 22, the applicant information registration unit 9 causes the face image of the applicant to be stored in the recruiter and applicant information storage unit 8.

The boundary learning unit 4 determines an image set for use in discriminating whether the face image of the applicant fulfills the recruiter's requirements by using the result of the determination made by the recruiter on each sample image.

In determining an image set for use in discriminating whether the face image of the applicant fulfills the recruiter's requirements, the image set may be determined aside from the sample image. Alternatively, the image set for use in discriminating whether the face image of the applicant fulfills the recruiter's requirements may be determined by selecting the image set from sample images. In an example illustrated in FIG. 2, description will be given for a case where the image set for use in discriminating whether the face image of the applicant fulfills the recruiter's requirements is selected from sample images.

Figure 2:
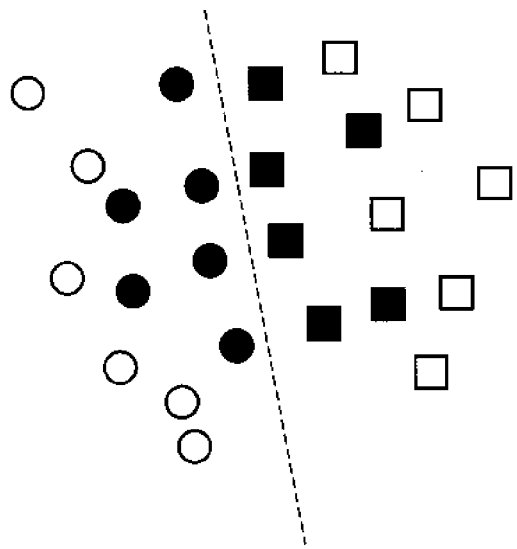
[FIG. 2] It depicts an explanatory diagram schematically illustrating an image set for use in discriminating whether the face image of an applicant fulfills the recruiter's requirements.

FIG. 2 is an explanatory diagram schematically illustrating an image set for use in discriminating whether the face image of the applicant fulfills the recruiter's requirements. Individual circles and rectangles illustrated in FIG. 2 schematically represent sample images. Further, the circle represents a sample image determined to be a face that fulfills the recruiter's requirements by the recruiter and the rectangle represents a sample image determined to be a face that does not fulfill the recruiter's requirements by the recruiter. When sample images corresponding to filled circles and rectangles are selected in FIG. 2 as an image set for use in discriminating whether the face image of the applicant fulfills the recruiter's requirements, a boundary (see a dashed line illustrated in FIG. 2) is determined from those sample images. This boundary is able to be referred to as the minimum criteria for recruiter's satisfaction. The boundary learning unit 4 determines the image set corresponding to the filled circles and rectangles in the schematic explanatory diagram illustrated in FIG. 2. The specific content of this processing will be described later.

While the sample images are distributed over a two-dimensional plane in order to schematically show the sample images in FIG. 2, each sample image is assumed to be represented by a vector with components having values representing the feature values of the image in this exemplary embodiment. Therefore, assuming that n is the number of components of the vector, the sample image can be represented as a single point in an n-dimensional space. Also in the case of determining an image set for use in discriminating whether the face image of the applicant fulfills the recruiter's requirements as images different from sample images, the images belonging to the image set are represented by vectors of the same dimension as the sample images.

The satisfaction level calculation unit 6 calculates a satisfaction level, which indicates to what extent the face image of each applicant fulfills the recruiter's requirements from the image set determined by the boundary learning unit 4 and the face image of the applicant, and identifies applicants who satisfy the criteria in terms of satisfaction level.

The notification unit 7 notifies the recruiter's terminal 21 of the applicants who satisfy the criteria in terms of satisfaction level.

The recruiter's terminal 21 is a terminal device having a display device (not illustrated) and an input device (not illustrated) operated by the recruiter. Upon receiving the sample images from the recruiter information registration unit 3, the recruiter's terminal 21 displays the sample images on the display device and prompts the recruiter to input a result of the determination. The recruiter inputs the result of the determination on whether the face displayed as the sample image fulfills the recruiter's requirements into the recruiter's terminal 21 for each sample image. Upon the input of the result of the determination on whether the face fulfills the recruiter's requirements for each sample image via the input device, the recruiter's terminal 21 transmits the result of the determination to the recruiter information registration unit 3.

The applicant's terminal 22 is a terminal device that transmits the face image of the applicant to the introduction system 1 via the communication network 20. Although this exemplary embodiment will be described by using the input mode of the face image of the applicant taking a mode in which the applicant's terminal 22 transmits the face image to the introduction system 1 as an example, the applicant may directly input the face image of the applicant to the introduction system 1.

Although only one applicant's terminal 22 is illustrated in FIG. 1, a plurality of applicants may exist and a plurality of applicants' terminals 22 may be connected to the introduction system 1. Then, each applicant's terminal 22 transmits the face image of the applicant to the introduction system 1, and the introduction system 1 notifies the recruiter's terminal 21 of applicants who satisfy the criteria in terms of satisfaction level among the applicants. Although only one recruiter's terminal 21 is illustrated in FIG. 1, a plurality of recruiters may exist and a plurality of recruiters' terminals 21 may be connected to the introduction system 1.

The recruiter information registration unit 3, the applicant information registration unit 9, the boundary learning unit 4, the satisfaction level calculation unit 6, and the notification unit 7 are each implemented by, for example, a CPU that operates according to a program (an introduction program). The program is stored in, for example, a program storage unit (not illustrated) of the introduction system 1 and the CPU may read the program to operate as the recruiter information registration unit 3, the applicant information registration unit 9, the boundary learning unit 4, the satisfaction level calculation unit 6, or the notification unit 7 according to the program. Moreover, the recruiter information registration unit 3, the applicant information registration unit 9, the boundary learning unit 4, the satisfaction level calculation unit 6, and the notification unit 7 may be each implemented as an individual hardware piece.

Subsequently, the operation will be described below.

As described above, in this exemplary embodiment, a sample image or each image that belongs to an image set for use in discriminating whether the face image of an applicant fulfills the recruiter's requirements is represented by a vector with components having values representing the feature values of the image. In this specification, it is assumed that the luminance value of each pixel of the image is the feature value of the image and that each image is represented by a vector with components having the luminance values of the pixels. For example, in a sample image represented by a vector ($a_1$, $a_2$, - - - , $a_n$), the luminance value of a first pixel is $a_1$, the luminance value of a second pixel is $a_2$, and the luminance value of an nth pixel is $a_n$. It is, however, assumed that the number of pixels is the same in each sample image and in each image that belongs to the image set for use in discriminating whether the face image of the applicant fulfills the recruiter's requirements and that a method of setting the order of pixels is the same in each image. Hereinafter, each image that belongs to the image set for use in discriminating whether the face image of the applicant fulfills the recruiter's requirements is referred to as "reference vector." The reference vector is able to be also referred to as "threshold image."

The feature value for use in representing an image is not limited to a luminance value of each pixel, but an image may be represented in a vector form by using any other feature value.

Figure 3:
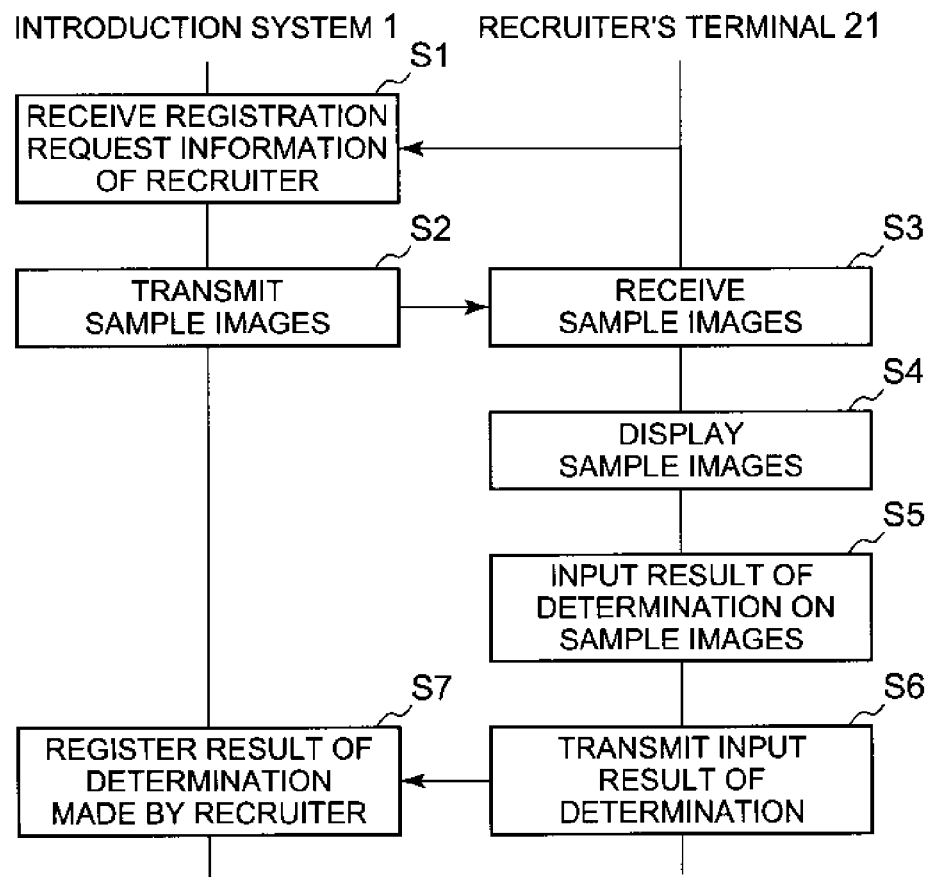
[FIG. 3] It depicts a flowchart illustrating an example of processing in which the introduction system registers a result of the determination made by the recruiter on whether a sample image fulfills the requirements.

The following describes an operation of the introduction system 1 for registering a result of a determination made by the recruiter on the sample image. FIG. 3 is a flowchart illustrating an example of processing in which the introduction system 1 registers a result of a determination made by the recruiter on whether a sample image fulfills the requirements. The recruiter's terminal 21 transmits registration request information of the recruiter to the introduction system 1 in response to the operation of the recruiter. Upon receiving the registration request information of the recruiter from the recruiter's terminal 21, the recruiter information registration unit 3 of the introduction system 1 registers information on the recruiter in the recruiter and applicant information storage unit 8 (step S1). For example, when receiving the address (for example, e-mail address) of the recruiter's terminal 21 or the like and an instruction of registering the information as the registration request information of the recruiter from the recruiter's terminal 21, the recruiter information registration unit 3 stores the received address or the like as information on a new recruiter into the recruiter and applicant information storage unit 8 in association with the recruiter. The information to be stored in the recruiter and applicant information storage unit 8 is not limited to the address of the recruiter's terminal 21. For example, the recruiter's terminal 21 may transmits the name and contact information of the recruiter in addition to the address to the introduction system 1, and the recruiter information registration unit 3 may store the received name and contact information along with the address into the recruiter and applicant information storage unit 8.

Subsequently, the recruiter information registration unit 3 transmits the sample images stored in the sample image storage unit 2 to the recruiter's terminal 21 via the communication network 20 (step S2).

Upon receiving the sample images from the introduction system 1 (step S3), the recruiter's terminal 21 displays the sample images (step S4). The recruiter determines whether each sample image (specifically, the face displayed as the sample image) fulfills the requirements and inputs a result of the determination into the recruiter's terminal 21. As a result, the recruiter's terminal 21 receives an input of a result of a determination on whether the face displayed as the sample image fulfills the recruiter's requirements for each sample image (step S5). Subsequently, the recruiter's terminal 21 transmits the result of the determination made by the recruiter input for each sample image to the introduction system 1 (step S6).

Thereafter, upon receiving the result of the determination on whether the face fulfills the recruiter's requirements for each sample image from the recruiter's terminal 21, the recruiter information registration unit 3 of the introduction system 1 stores the result of the determination into the recruiter and applicant information storage unit 8 in association with the address or the like of the recruiter's terminal 21 (step S7).

The following describes processing of the introduction system 1 for registering the face image or the like of the applicant. The applicant's terminal 22 transmits the face image or the like of the applicant to the introduction system 1 in response to the operation of the applicant. Upon receiving the face image or the like of the applicant from the applicant's terminal 22, the applicant information registration unit 9 of the introduction system 1 causes the received face image or the like of the applicant to be stored as information on a new applicant into the recruiter and applicant information storage unit 8.

In this exemplary embodiment, for ease of explanation, the face image of the applicant is assumed to be an image having the same number of pixels as a sample image or a reference vector. In this instance, the face image of the applicant is also able to be represented by a vector of the same dimension as the sample image or the like, as a vector with components having the luminance values of the pixels. If the face image of the applicant has a different number of pixels from that of the sample image, the applicant information registration unit 9 may enlarge or reduce the size of the face image of the applicant to make the face image of the applicant have the same number of pixels as the sample image or the like.

The sample image or the face image of the applicant is represented by a vector with components having the luminance values here as an example. Also when the sample image or the face image of the applicant is represented by a vector with components having feature values other than the luminance values, however, the applicant information registration unit 9 may convert the applicant image so that the face image of the applicant is represented by a vector of the same dimension as the sample image.

Further, this specification has described the operation of storing the face image of the applicant, as applicant information, into the recruiter and applicant information storage unit 8. The applicant's terminal 22, however, may transmit the name and contact information of the applicant in addition to the face image of the applicant and the applicant information registration unit 9 may store the received name and contact information along with the face image of the applicant into the recruiter and applicant information storage unit 8.

Figure 4:
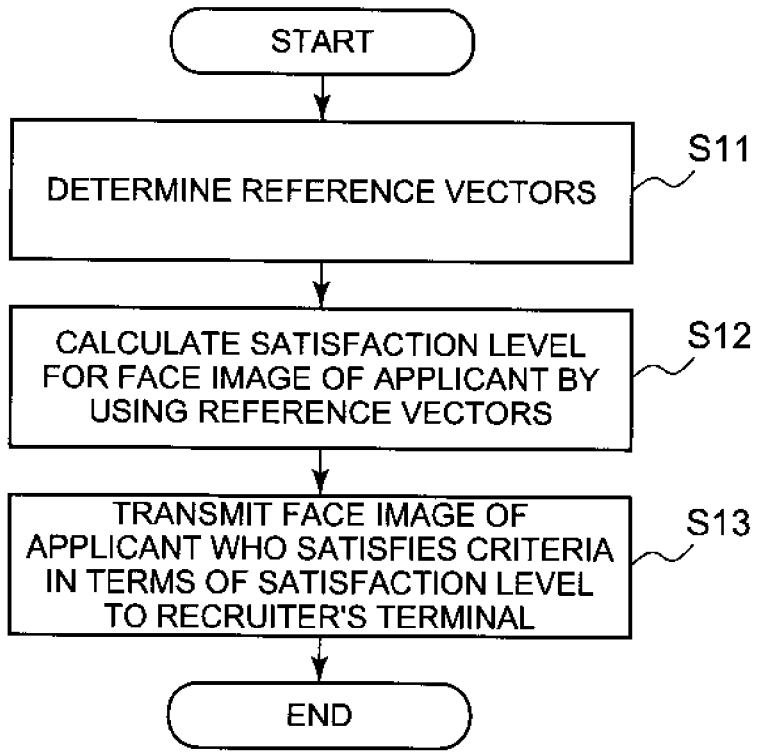
[FIG. 4] It depicts a flowchart illustrating an example of introduction processing.

The following describes an operation of the introduction system 1 for introducing an applicant who fulfills the recruiter's requirements to the recruiter. FIG. 4 is a flowchart illustrating an example of introduction processing performed by the introduction system 1.

The boundary learning unit 4 of the introduction system 1 determines an image set (reference vector set) for use in discriminating whether the face image of the applicant fulfills the recruiter's requirements on the basis of the result of the determination made by the recruiter on the sample images (step S11). As has been described, in determining an image set (reference vector set) for use in discriminating whether the face image of the applicant fulfills the recruiter's requirements, reference vectors may be determined as images other than sample images. Alternatively, reference vectors may be determined by selecting a reference vector set from sample images. In the description below, a reference vector set is selected, first, from sample images to determine the reference vectors, as an example.

In step S11, the boundary learning unit 4 selects a plurality of sample images to be candidates for reference vectors from sample images. Although the plurality of sample images initially selected as candidates are arbitrary, the boundary learning unit 4 selects a plurality of sample images, as candidates for the reference vectors, so as to include the sample images determined by the recruiter to fulfill the requirements and the sample images determined not to fulfill the requirements. Hereinafter, the candidates for the reference vectors will be referred to simply as "reference vector candidates."

Figure 5:
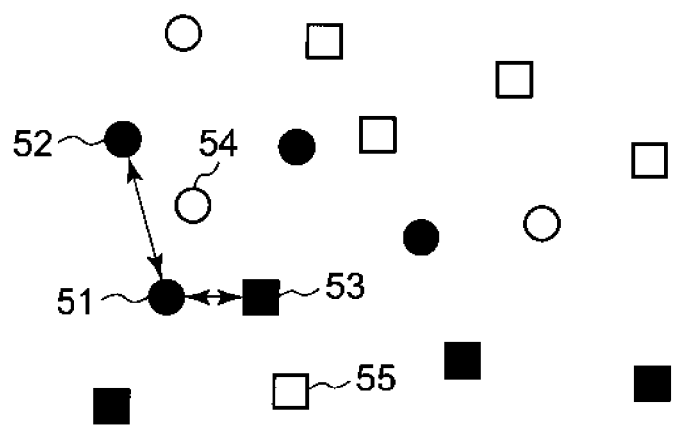
[FIG. 5] It depicts an explanatory diagram schematically illustrating sample images selected as reference vector candidates.

FIG. 5 is an explanatory diagram schematically illustrating sample images selected as reference vector candidates. Similarly to FIG. 2, individual circles and rectangles in FIG. 5 schematically represent sample images. While the sample images are illustrated so as to be distributed over a two-dimensional plane in FIG. 5, each sample image can be represented as a single point in an n-dimensional space with the vector components as coordinates if the sample image is an n-dimensional vector. In FIG. 5, the sample images corresponding to the filled circles and rectangles represent reference vectors selected as reference vector candidates. The boundary learning unit 4 selects reference vector candidates so as to include the sample images (sample images represented by circles) determined to fulfill the requirements and sample images (sample images represented by rectangles) determined not to fulfill the requirements, as illustrated in FIG. 5.

The boundary learning unit 4 may select the reference vector candidates so that the number of sample images determined to fulfill the requirements is the same as the number of sample images determined not to fulfill the requirements with respect to the reference vector candidates.

Further, the number of sample images selected as reference vector candidates may be previously determined according to, for example, the number of all sample images. Alternatively, the administrator of the introduction system 1 may input the number of reference vectors, so that the reference vector candidates are selected by the number of the reference vectors.

After selecting the plurality of reference vector candidates, the boundary learning unit 4 further selects one arbitrary reference vector candidate out of the plurality of reference vector candidates. The reference vector candidate is referred to as a focused candidate. In the example illustrated in FIG. 5, a sample image 51 is assumed to be a focused candidate.

The boundary learning unit 4 selects a reference vector candidate that is closest in distance to the focused candidate out of other reference vector candidates for which the same determination as the focused candidate has been made. The selected reference vector candidate will be referred to as "same type candidate." Further, the boundary learning unit 4 selects a reference vector candidate that is closest in distance to the focused candidate out of other reference vector candidates for which a different determination from the focused candidate has been made. The selected reference vector candidate will be referred to as "different type candidate." In the example illustrated in FIG. 5, the sample image 51, which is determined to fulfill the recruiter's requirements, is the focused candidate and therefore a sample image 52 is the same type candidate and a sample image 53 is the different type candidate.

The boundary learning unit 4 calculates a distance between the focused candidate and the same type candidate and a distance between the focused candidate and the different type candidate. Then, if the latter distance is less than the former, the boundary learning unit 4 selects a sample image, whose distance to the focused candidate is less than that of the same type candidate, out of the sample images, instead of the reference vector candidates, for which the same determination as the focused candidate has been made, considers the selected sample image as a reference vector candidate, and eliminates the same type candidate from the reference vector candidates. Further, the boundary learning unit 4 selects a sample image, whose distance to the focused candidate is more than that of the different type candidate, out of the sample images, instead of the reference vector candidates, for which the different determination from the focused candidate has been made, considers the selected sample image as a reference vector candidate, and eliminates the different type candidate from the reference vector candidates. In this manner, the boundary learning unit 4 replaces the reference vector candidates with each other.

Figure 6:
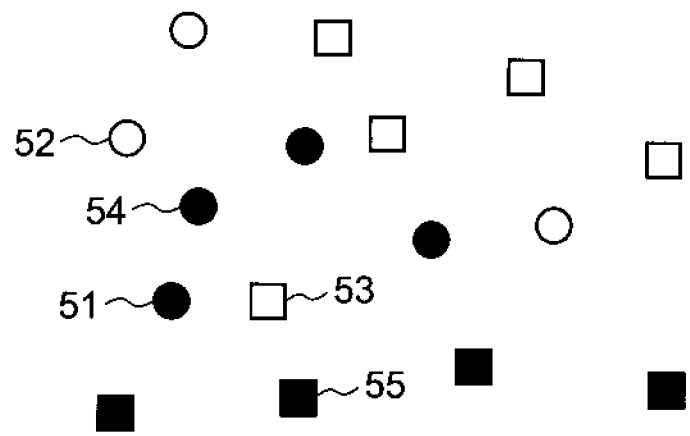
[FIG. 6] It depicts an explanatory diagram illustrating an example of replacing reference vector candidates.

The replacement of the reference vector candidates will be schematically described below with reference to FIG. 5 and FIG. 6. For example, the boundary learning unit 4 calculates a distance between the focused candidate 51 and the same type candidate 52 and a distance between the focused candidate 51 and the different type candidate 53 illustrated in FIG. 5. In the example illustrated in FIG. 5, the latter distance is less than the former. Therefore, the boundary learning unit 4 selects a sample image 54, whose distance to the focused candidate 51 is less than that of the same type candidate 52, out of the sample images, instead of the reference vector candidates, for which the same determination as the focused candidate 51 has been made, and eliminates the same type candidate 52 from the reference vector candidates (See FIG. 6). Further, the boundary learning unit 4 selects a sample image 55, whose distance to the focused candidate 51 is more than that of the different type candidate 53, out of the sample images, instead of the reference vector candidates, for which the different determination from the focused candidate 51 has been made, considers the sample image 55 as a reference vector candidate, and eliminates the different type candidate 53 from the reference vector candidates. FIG. 6 is an explanatory diagram schematically illustrating a result of replacing the reference vector candidates as described above. FIGS. 5 and 6 illustrate a case where the focused candidate is a sample image determined to fulfill the recruiter's requirements. The same applies to a case where the focused candidate is determined not to fulfill the recruiter's requirements.

After replacing the reference vector candidates, the boundary learning unit 4 selects another focused candidate and repeats the same processing.

Further, the boundary learning unit 4 calculates a distance between the focused candidate and the same type candidate and a distance between the focused candidate and the different type candidate. Then, if the latter distance is equal to or more than the former, the boundary learning unit 4 does not replace the reference vector candidates, but selects still another focused candidate and repeats the same processing.

After selecting the focused candidates in sequence and finding that there is no need to replace the reference vector candidates, the boundary learning unit 4 considers that the reference vector candidates have converged and determines the selected reference vector candidates to be reference vectors. For example, after selecting a focused candidate and then repeating the processing of calculating a distance between the focused candidate and the same type candidate and a distance between the focused candidate and the different type candidate a predetermined number of times without replacing reference vector candidates, the boundary learning unit 4 may determine the reference vector candidates at that time to be reference vectors.

Moreover, if the reference vectors are determined as images other than sample images, the boundary learning unit 4 may perform processing as described below. Also in this instance, the boundary learning unit 4 selects a reference vector candidate out of sample images. Then, the boundary learning unit 4 selects a focused candidate out of reference vector candidates and calculates a distance between the focused candidate and the same type candidate and a distance between the focused candidate and the different type candidate. This operation is the same as the above operation. Then, if the latter distance is less than the former, the boundary learning unit 4 selects a sample image, whose distance to the focused candidate is less than that of the same type candidate, out of the sample images, instead of the reference vector candidates, for which the same determination as the focused candidate has been made, considers a vector with components corresponding to the coordinates of a position where the same type candidate is moved by a certain distance in a direction toward the sample image in the n-dimensional space as a new reference vector candidate, and eliminates the same type candidate from the reference vector candidates. Further, the boundary learning unit 4 selects a sample image, whose distance to the focused candidate is more than that of the different type candidate out of the sample images, instead of the reference vector candidates, for which the different determination from the focused candidate has been made, considers a vector with components corresponding to the coordinates of a position where the different type candidate is moved by a certain distance in a direction toward the sample image in the n-dimensional space as a new reference vector candidate, and eliminates the different type candidate from the reference vector candidates.

For example, in the example illustrated in FIG. 5, the boundary learning unit 4 considers a vector with components corresponding to the coordinates of a position where the same type candidate 52 is moved by a certain distance in a direction toward the sample image 54 as a new reference vector candidate and eliminates the same type candidate 54 from the reference vector candidates. Further, the boundary learning unit 4 considers a vector with components corresponding to the coordinates of a position where the different type candidate 53 is moved by a certain distance in a direction toward the sample image 55 as a new reference vector candidate and eliminates the different type candidate 53 from the reference vector candidates.

Other points are the same as in the operation of step S11 described above. Specifically, after replacing the reference vector candidates, the boundary learning unit 4 selects another focused candidate and repeats the same processing. Further, the boundary learning unit 4 calculates a distance between the focused candidate and the same type candidate and a distance between the focused candidate and the different type candidate. If the latter distance is equal to or more than the former, the boundary learning unit 4 does not replace the reference vector candidates, but selects another focused candidate and repeats the same processing. After selecting the focused candidates in sequence and finding that there is no need to replace the reference vector candidates, the boundary learning unit 4 considers that the reference vector candidates have converged and determines the selected reference vector candidates to be reference vectors.

When the reference vectors are determined while the reference vector candidates are moved by a certain distance, the reference vectors eventually obtained are different from sample images.

A distance between images may be calculated as the norm of a difference between vectors. For example, a distance between reference vector candidates may be determined by calculating a difference between vectors, which are reference vector candidates, and considering the norm of the difference as the distance.

The above has described a case of determining reference vectors by selecting a reference vector set out of sample images and a case of determining reference vectors as images other than sample images. In either case, it can be concluded that the reference vector set is determined by using a machine learning technique of a boundary learning type with a result of a determination made by a recruiter on the sample image set and individual images as learning data.

After determining the reference vectors in step S11, the satisfaction level calculation unit 6 calculates a satisfaction level that indicates to what extent each applicant satisfies the recruiter's requirements in terms of face (step S12).

In step S12, the satisfaction level calculation unit 6 may calculate the satisfaction level, for example, as described below for each applicant. The satisfaction level calculation unit 6 calculates a distance between each reference vector, which is determined to fulfill the requirements by the recruiter among the reference vectors, and the face image of an applicant and then selects the shortest distance among the calculated distances. This distance is referred to as "satisfactory sample distance." In the same manner, the satisfaction level calculation unit 6 calculates a distance between each reference vector, which is determined not to fulfill the requirements by the recruiter among the reference vectors, and the face image of an applicant and then selects the shortest distance among the calculated distances. This distance is referred to as "unsatisfactory sample distance." The satisfaction level calculation unit 6 calculates the satisfaction level of the recruiter for the applicant by calculating, for example, the following equation (1):

$$\text{Satisfaction level} = \text{Unsatisfactory sample distance} / \text{Satisfactory sample distance} \qquad \text{Eq. (1)}$$

The equation (1), however, is only an example of a method of calculating a satisfaction level and any other calculation method may be used to obtain the satisfaction level.

Further, the face image of the applicant may be represented by a vector of the same dimension as the reference vector. Therefore, to obtain a distance between the vector of the face image of the applicant and an individual reference vector, the satisfaction level calculation unit 6 calculates the norm of a difference between the vectors and considers the norm as the distance.

The satisfaction level obtained in this manner means a degree of recruiter's satisfaction or dissatisfaction with the applicant.

Further, the satisfaction level calculation unit 6 identifies an applicant who satisfies the criteria in terms of satisfaction level in step S12. For example, the satisfaction level calculation unit 6 decides whether the satisfaction level is equal to or more than a predetermined threshold value and determines an applicant having a satisfaction level equal to or more than the threshold value to be an applicant who fulfills the minimum criteria of the recruiter's requirements.

Subsequently, the notification unit 7 notifies the recruiter's terminal 21 of the applicant determined by the satisfaction level calculation unit 6 (step S13). For example, the notification unit 7 transmits the face image of the applicant to the recruiter's terminal 21 with the address of the recruiter's terminal 21 stored in the recruiter and applicant information storage unit 8 as a destination. As a result, the applicant who fulfills the recruiter's requirements is introduced to the recruiter.

Moreover, the notification unit 7 may notify the applicant's terminal 22 of a result of processing performed by the satisfaction level calculation unit 6. Specifically, when the satisfaction level calculation unit 6 identifies the applicant who satisfies the minimum criteria of the recruiter, the notification unit 7 may notify the applicant's terminal 22 of the applicant of the information on the recruiter. In this case, the applicant's terminal 22 previously transmits, for example, an address (for example, an e-mail address) to the introduction system and the applicant information registration unit 9 may store the address into the recruiter and applicant information storage unit 8 in advance.

According to this exemplary embodiment, the recruiter is not caused to specify only a specific face image as the recruiter's requirements, but a plurality of sample images are presented to the recruiter to determine whether each sample image satisfies the requirements. Thereafter, the boundary learning unit 4 selects an image set (a plurality of reference vectors) for use in discriminating whether the appearance of the applicant fulfills the recruiter's requirements, and the satisfaction level calculation unit 6 calculates the satisfaction level from the reference vectors and the vector of the face image of the applicant. In this manner, the satisfaction level is calculated by using the reference vectors for use in discriminating whether the appearance fulfills the requirements. Therefore, the criteria for the satisfaction level can be set easily in comparison with a case where only a face image required by the recruiter is specified and an applicant is discriminated only on the basis of the degree of similarity to the face image. Accordingly, it is possible to identify, with a high degree of precision, applicants who fulfill the recruiter's requirements. Further, the recruiter less frequently receives introductions to applicants who do not fulfill the recruiter's requirements, thereby reducing the labor hours for the recruiter to deal with the introductions to the applicants who do not fulfill the recruiter's requirements.

With the configuration in which the recruiter specifies only a face image that the recruiter requires to discriminate applicants only on the basis of the degree of similarity to the face image, only a small number of applicants can be introduced if it is assumed that only applicants with the highest degree of similarity are introduced for introducing only applicants who fulfill the recruiter's requirements. On the other hand, the present invention provides the introduction system capable of identifying, with a high degree of precision, applicants who fulfill the recruiter's requirements as described above. Therefore, the introduction system is able to introduce applicants who fulfill the recruiter's requirements to some extent, if any, even if the applicants are not first choice persons for the recruiter, thereby preventing a reduction in the number of applicants to be introduced to the recruiter.

The introduction system of this exemplary embodiment is applicable to, for example, a marriage partner introduction service, a service for introducing an applicant who desires to be introduced as an actor to a recruiter who recruits an actor, or the like.

In this exemplary embodiment, applicants may be narrowed down under conditions other than the face image before the calculation of the satisfaction levels of the applicants having been narrowed down. For example, the recruiter's terminal 21 transmits registration request information of the recruiter with the inclusion of the conditions, other than the appearance, required by the recruiter when transmitting the registration request information of the recruiter in response to manipulation of the recruiter, and the recruiter information registration unit 3 registers the conditions to the recruiter and applicant information storage unit 8 along with the address of the recruiter's terminal 21 in step S1 (See FIG. 3). In this regard, the recruiter information registration unit 3 may register conditions related to a required body height, age, and the like. Moreover, the applicant's terminal 22 additionally transmits attribute information (for example, a body height, an age, etc.) representing the attributes, other than the appearance, of the applicant in response to manipulation of the applicant when transmitting the face image to the introduction system 1, and the applicant information registration unit 9 registers the received attribute information on the recruiter and applicant information storage unit 8 along with the face image of the applicant. Then, the satisfaction level calculation unit 6 may extract the face image of the applicant who satisfies the recruiter's requirements in terms of attribute information and may calculate the satisfaction level based on the face image. Applicants are narrowed down under the conditions other than the face image in this manner, thereby eliminating the calculation of the satisfaction levels on the applicants who do not satisfy the recruiter's requirements in terms of attribute information and thus enabling the calculation amount of the satisfaction levels to be reduced.

Figure 7:
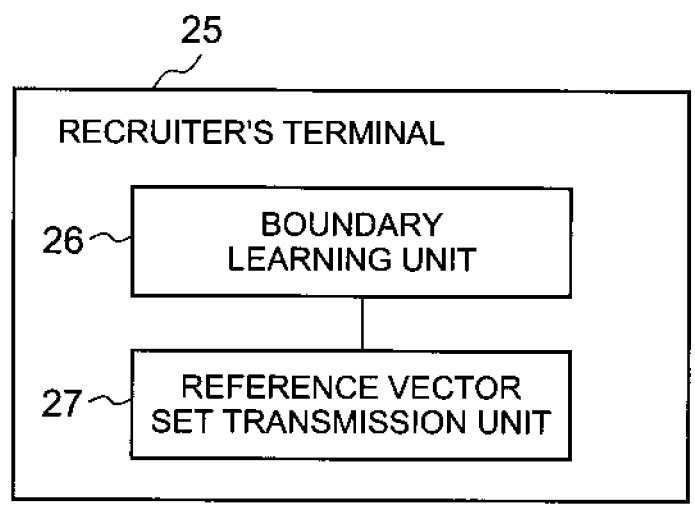
[FIG. 7] It depicts a block diagram illustrating an example of a recruiter's terminal that determines a reference vector set.

Moreover, the recruiter's terminal 21 may be adapted to determine the reference vector set. FIG. 7 is a block diagram illustrating an example of a recruiter's terminal that determines a reference vector set. A recruiter's terminal 25, which determines the reference vector set, includes a boundary learning unit 26 and a reference vector set transmission unit 27. The boundary learning unit 26 determines the reference vector set by using a result of a determination made by the recruiter on each sample image in the same manner as the boundary learning unit 4 described above. The reference vector set transmission unit 27 transmits the reference vector set, which has been generated by the boundary learning unit 26, to the introduction system 1. In this exemplary embodiment, the introduction system 1 may be without the boundary learning unit 4.

In this case, the boundary learning unit 26 displays each sample image on a display section (not illustrated) of the recruiter's terminal 25. If the result of the determination made by the recruiter on the sample images is input via an operating section (key or the like, not illustrated) of the recruiter's terminal 25, the boundary learning unit 26 may determine the reference vector set by using the result of the determination. Moreover, the recruiter's terminal 25 may request, for example, a sample image set from the introduction system 1 and the boundary learning unit 26 may display the respective sample images received from the introduction system 1. Alternatively, a sample image storage unit, which previously stores sample images, may be provided in the recruiter's terminal 25.

The boundary learning unit 26 determines the reference vector set by the same operation as in step S11 (See FIG. 4). After the determination of the reference vector set, the reference vector set transmission unit 27 transmits the reference vector set to the introduction system 1. After receiving the reference vector set, the introduction system 1 may perform the processing in step S12 (See FIG. 4) and after.

Second Exemplary Embodiment

In some cases, an individual recruiter serves as an applicant and vice versa. For example, in the marriage partner introduction service or the like, a service user is a person (recruiter) who seeks a marriage partner and, at the same time, a person (applicant) who wants to be introduced to any other person. Hereinafter, the person who is a recruiter and, at the same time, an applicant is referred to as "recruiter-cum-applicant." The introduction system of the second exemplary embodiment introduces a recruiter-cum-applicant to another recruiter-cum-applicant so that the recruiters-cum-applicants mutually fulfill the requirements.

Figure 8:
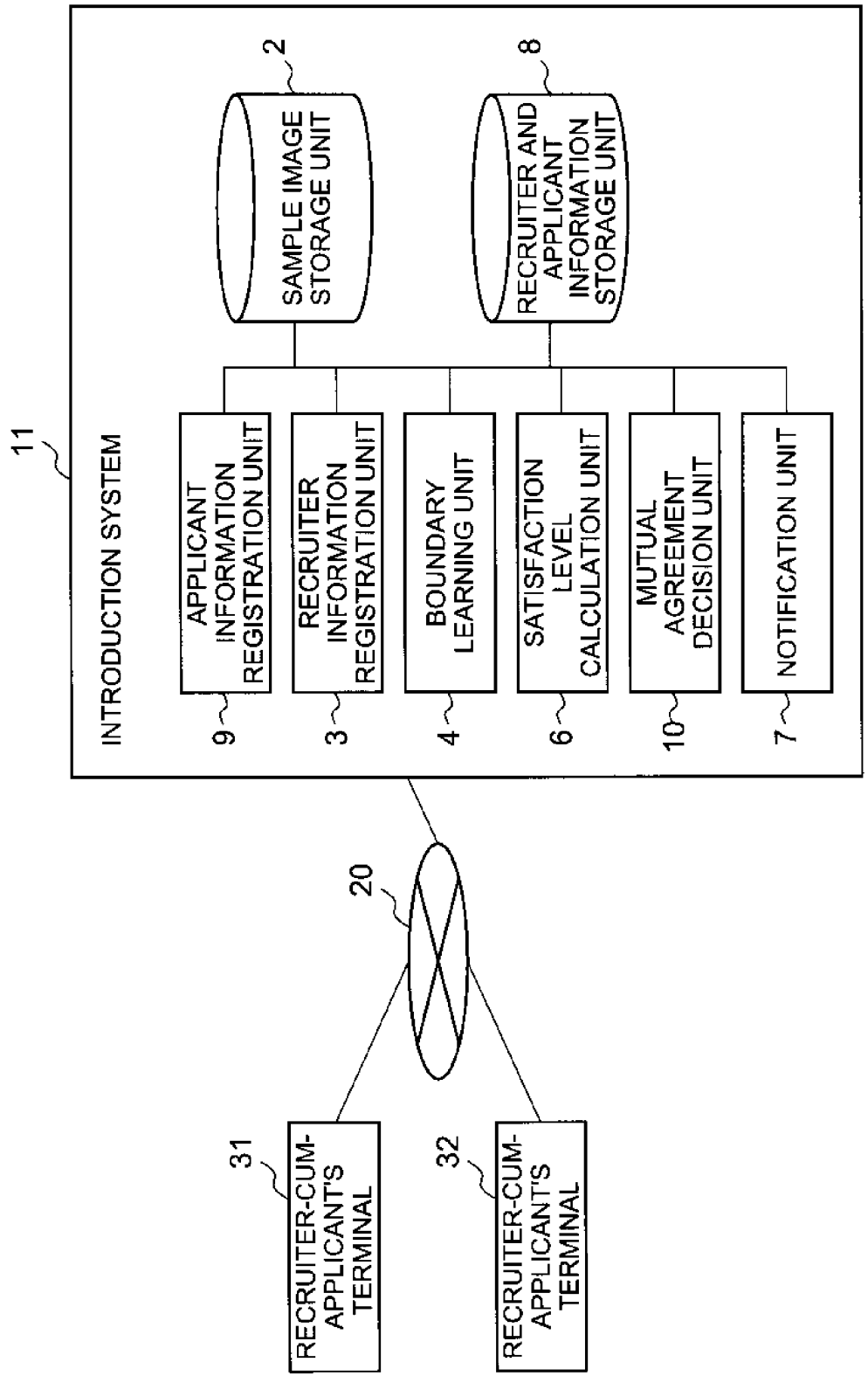
[FIG. 8] It depicts a block diagram illustrating an example of an introduction system according to a second exemplary embodiment of the present invention.

FIG. 8 is a block diagram illustrating an example of an introduction system according to the second exemplary embodiment of the present invention. The same reference numerals as for FIG. 1 are used for the same elements as in the first exemplary embodiment and the detailed description thereof is omitted here. The introduction system 11 according to this exemplary embodiment includes a sample image storage unit 2, a recruiter and applicant information storage unit 8, a recruiter information registration unit 3, an applicant information registration unit 9, a boundary learning unit 4, a satisfaction level calculation unit 6, a mutual agreement decision unit 10, and a notification unit 7.

Moreover, each of terminals 31 and 32 connected to the introduction system 11 of this exemplary embodiment is used by a recruiter-cum-applicant and therefore will be hereinafter referred to as "recruiter-cum-applicant's terminal." Although two recruiter-cum-applicant's terminals 31 and 32 are illustrated in FIG. 8, three or more recruiter-cum-applicant's terminals may exist and three or more recruiter-cum-applicant's terminals may be connected to the introduction system 11. Each of the recruiter-cum-applicant's terminals 31 and 32 transmits registration request information, a result of a determination made by the recruiter-cum-applicant on sample images, and the face image of the recruiter-cum-applicant to the introduction system 11.

In the same manner as in the first exemplary embodiment, the satisfaction level calculation unit 6 calculates the satisfaction level of each recruiter-cum-applicant for other recruiters-cum-applicants and identifies those who satisfy the criteria in terms of satisfaction level out of other recruiters-cum-applicants.

The mutual agreement decision unit 10 identifies a pair of recruiters-cum-applicants who mutually fulfill the requirements. Specifically, the mutual agreement decision unit 10 identifies a pair of recruiters-cum-applicants who mutually satisfy the criteria in terms of satisfaction level for the counterpart.

The notification unit 7 notifies the recruiter-cum-applicant's terminal of each of the pair of recruiters-cum-applicants identified by the mutual agreement decision unit 10 about the other recruiter-cum-applicant as a counterpart.

The mutual agreement decision unit 10 is implemented by, for example, a CPU that operates according to a program (an introduction program). As has been described in the first exemplary embodiment, for example, the CPU may read the program to operate as the recruiter information registration unit 3, the applicant information registration unit 9, the boundary learning unit 4, the satisfaction level calculation unit 6, the mutual agreement decision unit 10, or the notification unit 7 according to the program. Each of these units may be implemented as an individual hardware piece.

Subsequently, the operation will be described below.

The operation is the same as in steps S1 to S7 (See FIG. 3) in that each of the recruiter-cum-applicant's terminals 31 and 32, as a recruiter's terminal, transmits a result of a determination made by the recruiter-cum-applicant on the address and a sample image, and the recruiter information registration unit 3 stores the address of a terminal into the recruiter and applicant information storage unit 8 or stores the result of the determination on the sample image into the recruiter and applicant information storage unit 8.

Moreover, the operation is the same as in the first exemplary embodiment in that each of the recruiter-cum-applicant's terminals 31 and 32 transmits a face image as an applicant's terminal and the applicant information registration unit 9 stores the face image into the recruiter and applicant information storage unit 8.

Further, the address of the terminal and the face image may be registered at a time. For example, the recruiter-cum-applicant's terminal 31 may transmit registration request information, which includes the address and the face image, to the introduction system 11. Then, the recruiter information registration unit 3 of the introduction system 11 may store the received address into the recruiter and applicant information storage unit 8, and the applicant information registration unit 9 may store the received face image into the recruiter and applicant information storage unit 8.

Figure 9:
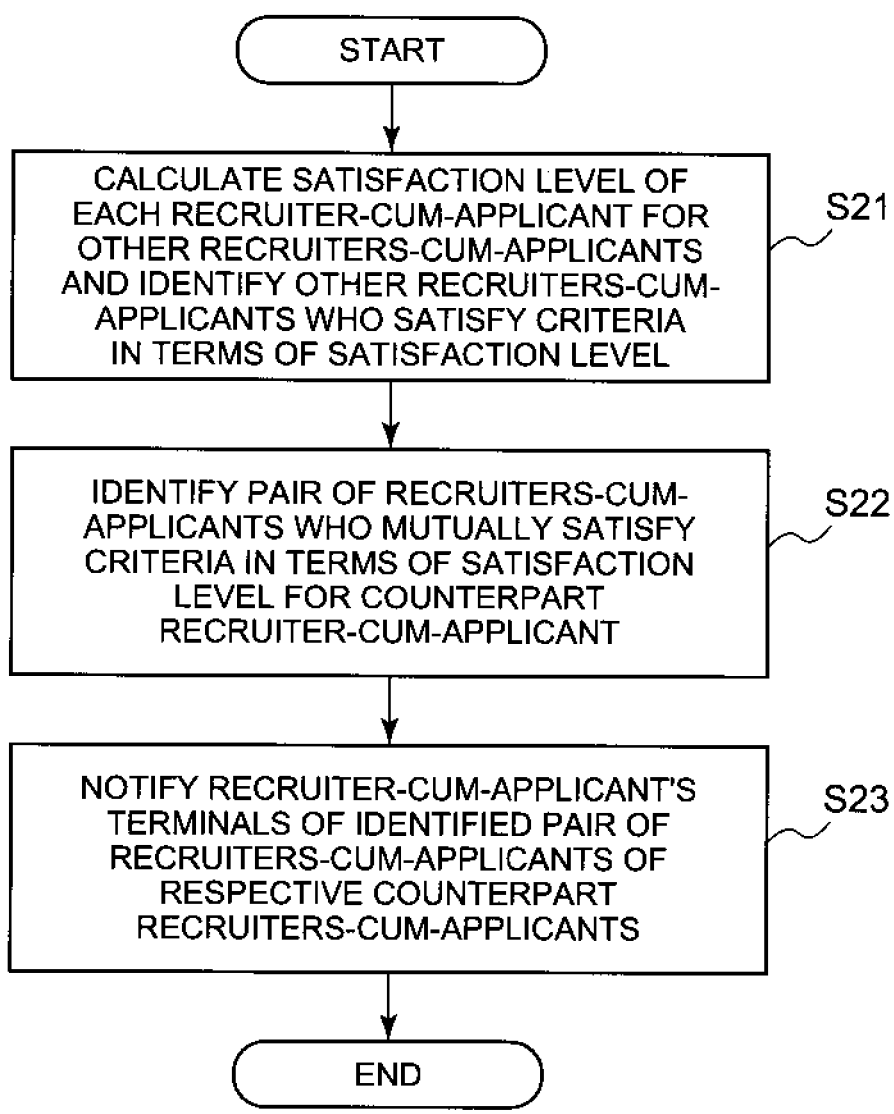
[FIG. 9] It depicts a flowchart illustrating an example of processing of the second exemplary embodiment.

The following describes processing in which the introduction system 11 notifies each of the recruiters-cum-applicants who mutually fulfill the requirements about the counterpart recruiter-cum-applicant. FIG. 9 is a flowchart illustrating an example of processing of the second exemplary embodiment.

The introduction system 11 calculates the satisfaction level of each recruiter-cum-applicant for other recruiters-cum-applicants and identifies other recruiters-cum-applicants who satisfy the criteria in terms of satisfaction level (step S21).

For example, it is assumed that there are k recruiters-cum-applicants. The introduction system 11 selects a first recruiter-cum-applicant and calculates the satisfaction level of the recruiter-cum-applicant for each of other recruiters-cum-applicants. Further, the introduction system 11 identifies each recruiter-cum-applicant who satisfies the criteria in terms of satisfaction level as a person who fulfills the first recruiter-cum-applicant's requirements. Then, with respect to a second to k-th recruiters-cum-applicants, the introduction system 11 sequentially selects the corresponding recruiter-cum-applicant and selects each of other recruiters-cum-applicants who fulfill the requirements of the selected recruiter-cum-applicant. The order of selection of the recruiters-cum-applicants is arbitrary.

In step S21, for example, the boundary learning unit 4 selects one recruiter-cum-applicant and determines reference vectors related to the recruiter-cum-applicant from the result of the determination made by the recruiter-cum-applicant on the sample images. The boundary learning unit 4 performs the reference vector identification process in the same manner as in step S11 (See FIG. 4).

After the reference vector identification, the satisfaction level calculation unit 6 calculates the satisfaction level of the selected recruiter-cum-applicant for each of other recruiters-cum-applicants and decides whether the calculated satisfaction level satisfies the criteria. The satisfaction level calculation unit 6 may perform this process in the same manner as in step S12 described in the first exemplary embodiment. Although the satisfaction level may be calculated by using the calculation formula of the equation (1), the satisfaction level may be calculated by using any other calculation formula. As to a decision on whether the satisfaction level satisfies the criteria, for example, whether the satisfaction level is equal to or more than a predetermined threshold value is decided: if the satisfaction level is equal to or more than the threshold value, the satisfaction level may be determined to satisfy the criteria; and if the satisfaction level is less than the threshold value, the satisfaction level may be determined not to satisfy the criteria.

Moreover, after the decision of other recruiters-cum-applicants who satisfy the criteria in terms of satisfaction level with respect to one recruiter-cum-applicant, the boundary learning unit 4 may select the next recruiter-cum-applicant again and may repeat the reference vector determination process and subsequent processes (the same processes as in the above steps S11 and S12). When there is no unselected recruiter-cum-applicant left, step S21 ends.

Subsequent to step S21, the mutual agreement decision unit 10 identifies a pair of recruiters-cum-applicants who mutually satisfy the criteria in terms of satisfaction level for the counterpart recruiter-cum-applicant (step S22). Since other recruiters-cum-applicants who fulfill the requirements are identified for each recruiter-cum-applicant in step S21, the recruiters-cum-applicants identified for each recruiter-cum-applicant may be checked to identify a pair of recruiters-cum-applicants who mutually satisfy the criteria in terms of satisfaction level for the counterpart recruiter-cum-applicant. For example, with respect to a recruiter-cum-applicant A, recruiter-cum-applicants B and C are assumed to be identified as recruiters-cum-applicants who satisfy the criteria in terms of satisfaction level. In this condition, the mutual agreement decision unit 10 decides whether A is identified as a recruiter-cum-applicant who satisfies the criteria in terms of satisfaction level with respect to the recruiter-cum-applicant B. If A is identified, the mutual agreement decision unit 10 identifies a pair of A and B as a pair of recruiters-cum-applicants who mutually satisfy the criteria in terms of satisfaction level for the counterpart recruiter-cum-applicant. In the above example, C is also identified as a recruiter-cum-applicant who satisfies the criteria in terms of satisfaction level with respect to the recruiter-cum-applicant A, and therefore the decision on C may be made in the same manner. As a result, a pair including the recruiter-cum-applicant A (for example, a pair of A and B or a pair of A and C) is able to be identified. Also with respect to other recruiters-cum-applicants, the mutual agreement decision unit 10 may identify a pair including the corresponding recruiter-cum-applicant in the same manner as described above.

The notification unit 7 notifies the recruiter-cum-applicant's terminals of the pair of recruiters-cum-applicants identified by the mutual agreement decision unit 10 of the respective counterpart recruiters-cum-applicants (step S23). For example, it is assumed that a pair of the recruiters-cum-applicants A and B is identified by the mutual agreement decision unit 10. In this condition, the notification unit 7 transmits the face image of the recruiter-cum-applicant B with the address of the recruiter-cum-applicant A as a destination and transmits the face image of the recruiter-cum-applicant A with the address of the recruiter-cum-applicant B as a destination. If a plurality of pairs are identified, the notification unit 7 may perform the notification process for each pair.

Further, the notification unit 7 notifies only the recruiter-cum-applicant's terminals of the pair of recruiters-cum-applicants identified by the mutual agreement decision unit 10 (in other words, the pair of recruiters-cum-applicants who mutually fulfill the requirements). Therefore, unless the recruiter-cum-applicant P does not fulfill the requirements of the recruiter-cum-applicant Q even if the recruiter-cum-applicant Q fulfills the requirements of the recruiter-cum-applicant P, the notification unit 7 does not transmit either of the face images of the counterparts to the recruiters-cum-applicants' terminals of the recruiters-cum-applicants P and Q. This produces an effect of preventing the private information (face image, etc.) of the recruiter-cum-applicant Q from being transmitted to the recruiter-cum-applicant P who does not fulfill the requirements of the recruiter-cum-applicant Q.

Further, when the mutual agreement decision unit 10 identifies a pair of recruiters-cum-applicants, in some cases, there is a relationship established between one recruiter-cum-applicant and each of other recruiters-cum-applicants in such a way that the recruiters-cum-applicants mutually satisfy the criteria in terms of satisfaction level for the counterpart. For example, in some cases, there is a relationship established between one recruiter-cum-applicant A and another recruiter-cum-applicant B so that the recruiters-cum-applicants A and B mutually satisfy the criteria in terms of satisfaction level for the counterpart and the same relationships are established between a pair of recruiters-cum-applicants A and C and between a pair of recruiters-cum-applicants A and D. In this case, the mutual agreement decision unit 10 may identify a plurality of pairs so that one recruiter-cum-applicant (A in this exemplary embodiment) is shared by other recruiters-cum-applicants, such as the pair of A and B, the pair of A and C, and the pair of A and D. Alternatively, when the above relationship is established between one recruiter-cum-applicant and each of a plurality of other recruiters-cum-applicants, the mutual agreement decision unit 10 may narrow down choices to the pairs of recruiters-cum-applicants in which one recruiter-cum-applicant (A in this exemplary embodiment) is shared by others. In this case, with respect to one recruiter-cum-applicant, the satisfaction levels calculated for each of the plurality of other recruiters-cum-applicants are compared with each other, and the recruiter-cum-applicant having the highest satisfaction level may be identified out of other recruiters-cum-applicants. For example, in the above example, the mutual agreement decision unit 10 compares the satisfaction level of the recruiter-cum-applicant A for the recruiter-cum-applicant B, the satisfaction level of the recruiter-cum-applicant A for the recruiter-cum-applicant C, and the satisfaction level of the recruiter-cum-applicant A for the recruiter-cum-applicant D with each other and identifies the recruiter-cum-applicant having the highest satisfaction level out of the recruiters-cum-applicants B, C, and D other than the recruiter-cum-applicant A. Thereafter, the mutual agreement decision unit 10 identifies a pair of the recruiter-cum-applicant A and any other recruiter-cum-applicant (for example, C) decided to have the highest satisfaction level as a pair of recruiters-cum-applicants that mutually satisfy the criteria in terms of satisfaction level for the counterpart recruiter-cum-applicant. Then, other pairs (the pair of A and B and the pair of A and D) are eliminated from the pairs of recruiters-cum-applicants. In this instance, the notification unit 7 notifies only the recruiter-cum-applicant's terminals of the recruiters-cum-applicants A and C of the respective counterpart recruiters-cum-applicants.

Also in the second exemplary embodiment, the satisfaction level is calculated by using the reference vectors for use in discriminating whether the applicant fulfills the requirements of the recruiter. Therefore, the criteria for the satisfaction level is able to be set easily in comparison with a case where only a face image required by each person is specified and the introduced person is determined only on the basis of the degree of similarity to the face image. As a result, a person who fulfills the requirements of each recruiter-cum-applicant is able to be identified with a high degree of precision. Further, the labor hours are reduced for each recruiter-cum-applicant to deal with the introductions of the persons who do not fulfill the requirements of the recruiter-cum-applicant.

Moreover, in the process of identifying other recruiters-cum-applicants who fulfill the requirements of each recruiter-cum-applicant (step S21), it is possible to identify a person who fulfills the requirements of the recruiter-cum-applicant to some extent, if any, as a person who fulfills the requirements of the recruiter-cum-applicant even if the person is not a first choice. Therefore, other persons to be identified as those who fulfill the requirements are not reduced for each recruiter-cum-applicant. Accordingly, the number of pairs of the recruiters-cum-applicants who mutually fulfill the requirements is not reduced, thereby preventing a reduction in the number of introductions. Specifically, on the condition that only the first choice of each person is identified and only pairs of first choices are identified, only a small number of pairs are able to be identified. In this exemplary embodiment, however, it is possible to prevent a reduction in the number of identified persons who fulfill the requirements for each recruiter-cum-applicant, thereby preventing a reduction in the number of pairs of persons who mutually fulfill the requirements.

Moreover, the notification unit 7 transmits the face images of the counterparts to the recruiter-cum-applicant's terminals only for the recruiters-cum-applicants that form a pair of the recruiters-cum-applicants who mutually fulfill the requirements. Therefore, for each recruiter-cum-applicant, there is an effect of preventing the private information of the recruiter-cum-applicant from being transmitted to the counterpart who does not fulfill the requirements of the recruiter-cum-applicant.

This exemplary embodiment is preferably applied in the case where it is desirable to notify persons who mutually fulfill the requirements of each other. For example, the exemplary embodiment is applicable to a marriage partner introduction service.

Further, also in the second exemplary embodiment, the recruiters-cum-applicants may be narrowed down under conditions other than the face image before the calculation of the satisfaction levels. For example, each of the recruiter-cum-applicant's terminals 31 and 32 transmits registration request information of the recruiter-cum-applicant with the inclusion of the conditions, other than the appearance, required by the recruiter-cum-applicant when transmitting the registration request information of the recruiter-cum-applicant in response to manipulation of the recruiter-cum-applicant, and the recruiter information registration unit 3 registers the conditions to the recruiter and applicant information storage unit 8 along with the address of the recruiter-cum-applicant's terminal. As illustrated in the first exemplary embodiment, the conditions may be a body height, an age, and the like, for example. Each of the recruiters-cum-applicants 31 and 32 additionally transmits attribute information (for example, a body height, an age, etc.) representing the attributes other than the appearance of the recruiter-cum-applicant in response to manipulation of the recruiter-cum-applicant when transmitting the face image of the recruiter-cum-applicant to the introduction system 11, and the applicant information registration unit 9 registers the received attribute information on the recruiter and applicant information storage unit 8 along with the face image. Then, when calculating the satisfaction level of the selected recruiter-cum-applicant for other recruiters-cum-applicants, the satisfaction level calculation unit 6 may extract other recruiters-cum-applicants who satisfy the requirements of the selected recruiter-cum-applicant and may calculate the satisfaction level based on the face image. This configuration enables a reduction in the calculation amount of the satisfaction level.

Also in the second exemplary embodiment, the terminal may determine a reference vector set and transmit the reference vectors to the introduction system 11. For example, the recruiter-cum-applicant's terminals 31 and 32 illustrated in FIG. 8 may include a boundary learning unit 26 and a reference vector set transmission unit 27 in the same manner as the recruiter's terminal 25 (See FIG. 7). In this case, upon receiving an input of a result of a determination made by the recruiter on the sample image, the boundary learning unit 26 included in each of the recruiter-cum-applicant's terminals 31 and 32 may determine a reference vector set in the same manner as in step S11 (See FIG. 4) by using the result of the determination. Each of the recruiter-cum-applicant's terminals 31 and 32 may request the introduction system 11 to transmit, for example, a sample image set and the boundary learning unit 26 may display the respective sample images received from the introduction system 11. Alternatively, a sample image storage unit, which stores sample images, may be previously provided in each of the recruiter-cum-applicant's terminals 31 and 32. After the determination of the reference vector set, the reference vector set transmission unit 27 transmits the reference vector set to the introduction system 11. The introduction system 11 calculates the satisfaction level by using the reference vector set received from each of the recruiter-cum-applicant's terminals 31 and 32.

While the description has been made in the above exemplary embodiments taking a case where the sample images and the images transmitted by the applicant's terminal (or the recruiter-cum-applicant's terminal) to the introduction system 11 are face images as an example, these images always need not be face images.

Further, while the boundary learning unit 4, which determines reference vectors, and the satisfaction level calculation unit 6, which calculates a satisfaction level, are provided in the same device in the above exemplary embodiments, the boundary learning unit 4 and the satisfaction level calculation unit 6 may be provided in separate devices. Hereinafter, an exemplary embodiment relating to this case will be described. In this exemplary embodiment, a threshold image set generation system determines reference vectors (a threshold image set) and an agreement possibility decision system decides the possibility of agreement between the recruiter and the applicant by using the reference vectors. In this exemplary embodiment, the threshold image set generation system is applied to, for example, an applicant's terminal, thereby enabling the applicant to be informed of the possibility of agreement with the recruiter in advance.

Figure 10:
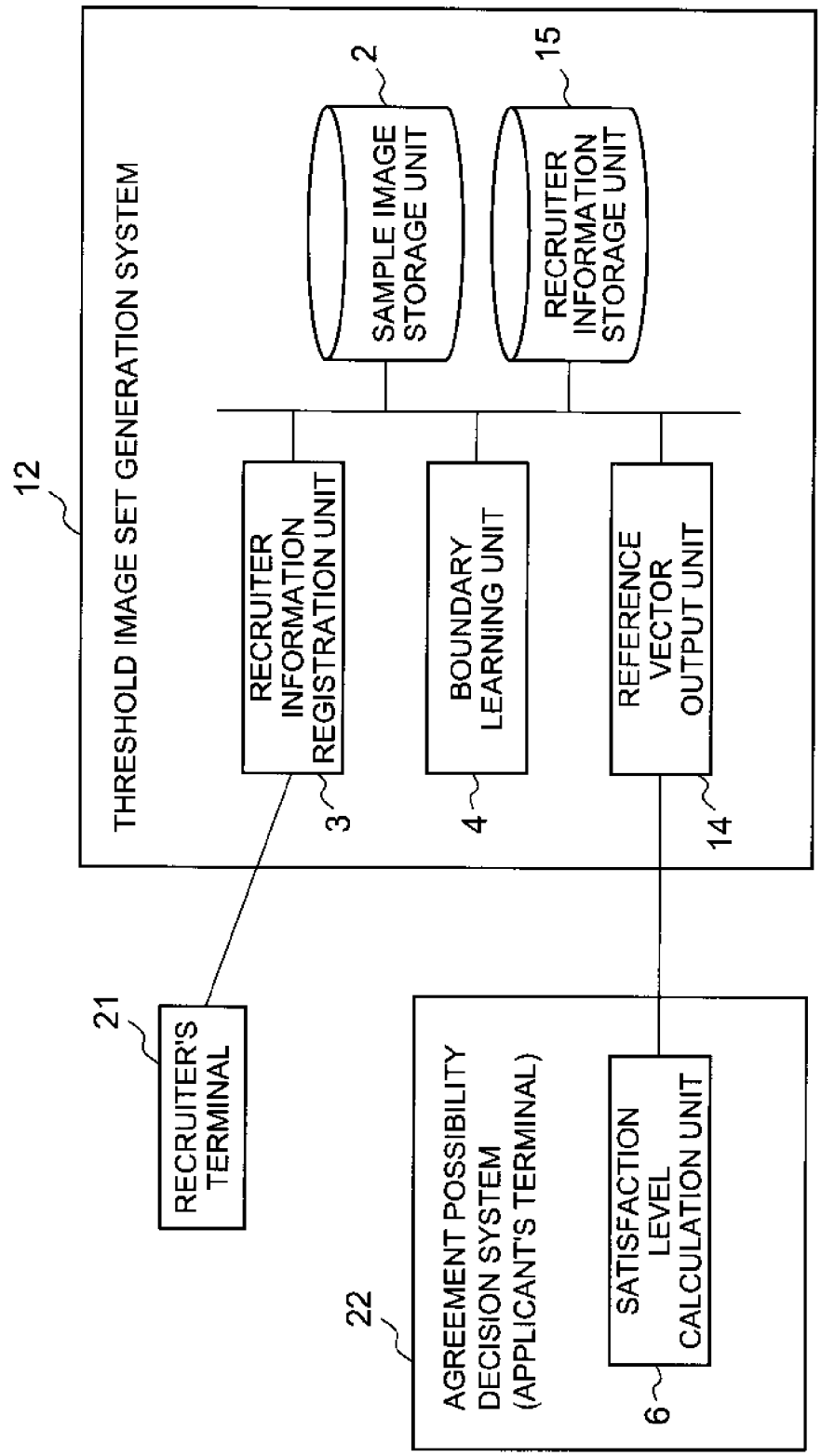
[FIG. 10] It depicts a block diagram illustrating a configuration example of a threshold image set generation system and an agreement possibility decision system.

FIG. 10 is a block diagram illustrating a configuration example of the threshold image set generation system and the agreement possibility decision system. In the example in FIG. 10, there is illustrated a case where the agreement possibility decision system is applied to an applicant's terminal. The same reference numerals as for FIGS. 1 and 8 are used for the same constituent elements as in the first and second exemplary embodiments and the detailed description thereof is omitted here.

The threshold image set generation system 12 includes a recruiter information registration unit 3, a boundary learning unit 4, a reference vector output unit 14, a sample image storage unit 2, and a recruiter information storage unit 15.

The sample image storage unit 2 stores sample images, which are the same as in the first exemplary embodiment and the second exemplary embodiment. The recruiter information storage unit 15 stores a result of a determination on whether a face represented by each sample image fulfills the recruiter's requirements.

The result of the determination on whether the face represented by each sample image fulfills the recruiter's requirements is input to the recruiter information registration unit 3, and the recruiter information registration unit 3 stores the result of the determination into the recruiter information storage unit 15. The input mode of the result of the determination on each sample image may be one, for example, in which the recruiter information registration unit 3 transmits the sample images stored in the sample image storage unit 2 to the recruiter's terminal 21 and receives the result of the determination made by the recruiter on whether the sample images fulfill the recruiter's requirements from the recruiter's terminal 21, in the same manner as in the first exemplary embodiment. In this case, in the same manner as in the first exemplary embodiment, the recruiter's terminal 21 displays each sample image, the recruiter determines each sample image, and the recruiter's terminal 21 transmits the result of the determination to the threshold image set generation system 12. Alternatively, the result of the determination made by the recruiter may be directly input to the threshold image set generation system 12, instead of from the recruiter's terminal 21. In this case, for example, the recruiter information registration unit 3 may cause a display device (not illustrated), which is provided in the threshold image set generation system, to display each sample image, and the result of the determination made by the recruiter on each sample image may be input to the recruiter information registration unit 3.

The boundary learning unit 4 determines reference vectors by using the result of the determination made by the recruiter on each sample image. This operation is the same as the operation of the boundary learning unit 4 (See FIG. 1) of the introduction system described in the first exemplary embodiment.

The reference vector output unit 14 outputs the result of the determination made by the recruiter on each sample image and the reference vectors determined by the boundary learning unit 4. In this exemplary embodiment, the reference vector output unit 14 transmits the reference vectors and the result of the determination made by the recruiter to the agreement possibility decision system (applicant's terminal) 22. The output mode of the reference vectors may be one in which the reference vector output unit 14 stores the reference vectors and the result of the determination made by the recruiter into a storage medium and the storage medium is supplied to the agreement possibility decision system 22.

The recruiter information registration unit 3, the boundary learning unit 4, and the reference vector output unit 14 are each implemented by, for example, a CPU that operates according to a program. Each of these units may be implemented as an individual hardware piece.

This threshold image set generation system enables the generation of reference vectors (a threshold image set) for use in discriminating, with a high degree of precision, applicants who fulfill the recruiter's requirements. Then, the applicants who fulfill the recruiter's requirements are able to be discriminated with a high degree of precision by using the reference vectors.

The agreement possibility decision system 22 includes a satisfaction level calculation unit 6. The satisfaction level calculation unit 6 calculates the satisfaction level of a recruiter on an applicant by using the face image of the applicant, the reference vectors, and a result of a determination made by the recruiter. Although the satisfaction level calculation unit 6 receives the reference vectors from the reference vector output unit 14 in this exemplary embodiment, the reference vectors may be input to the agreement possibility decision system 22 in another exemplary embodiment. Moreover, the input mode of the applicant's face image to the agreement possibility decision system is not particularly limited. For example, the agreement possibility decision system may include a camera and the camera may be used to take an image of the applicant's face to generate the face image of the applicant.

The satisfaction level calculation unit 6 calculates a satisfactory sample distance and an unsatisfactory sample distance, for example, in the same manner as in the first exemplary embodiment and calculates the satisfaction level on the basis of the distances. The satisfaction level calculation unit 6 may calculate a distance between each reference vector, which is determined to fulfill the requirements by the recruiter, and the face image of the applicant and may select the shortest distance, as a satisfactory sample distance, among the calculated distances. Further, the satisfaction level calculation unit 6 may calculate a distance between each reference vector, which is determined not to fulfill the requirements by the recruiter, and the face image of the applicant and may select the shortest distance, as an unsatisfactory sample distance, among the calculated distances. The satisfaction level calculation unit 6 may calculate the satisfaction level by calculating, for example, the equation (1). As described in the first exemplary embodiment, the equation (1) is only an example of a method of calculating the satisfaction level and therefore any other calculation method may be used to calculate the satisfaction level.

The satisfaction level calculation unit 6 displays the calculated satisfaction level on a display device (not illustrated) of the agreement possibility decision system 22. The applicant using the agreement possibility decision system 22 is able to confirm the possibility of agreement between the applicant and the recruiter in advance on the basis of the satisfaction level of the recruiter calculated by the satisfaction level calculation unit 6. If there is the possibility of agreement with the recruiter, the applicant is able to apply to the recruiter.

Moreover, the satisfaction level calculation unit 6 may decide whether the calculated satisfaction level is equal to or more than a predetermined threshold value and may output a result of the determination thereof. The satisfaction level equal to or more than the threshold value indicates that the applicant satisfies the minimum conditions for the recruiter's requirements and therefore the applicant is able to confirm the possibility of agreement with the recruiter more clearly.

The satisfaction level calculation unit 6 is implemented by, for example, a CPU that operates according to a program.

In each of the above exemplary embodiments, the sample images and the image of an applicant may be images other than the image of a human. For example, the sample images may be the images of a dog, a cat, or other animals and the image registered as the image of an applicant may be the image of an animal. In that case, the present invention is applicable to, for example, a service for introducing a person who wants to sell a pet to a person who wants to buy a pet or for introducing persons who want a pet marriage to each other.

Figure 11:
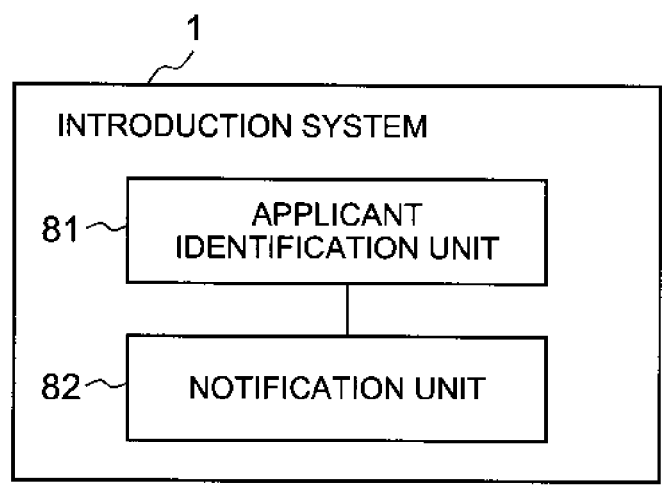
[FIG. 11] It depicts a block diagram illustrating the outline of the present invention.

Subsequently, the outline of the present invention will be described. FIG. 11 is a block diagram illustrating the outline of the present invention. The introduction system 1 of the present invention includes an applicant identification unit 81 and a notification unit 82.

The applicant identification unit 81 (for example, the satisfaction level calculation unit 6) identifies an applicant who satisfies the minimum criteria on the basis of an input image of the applicant and a threshold image set (for example, a reference vector set) for use in discriminating the minimum criteria for determining whether the recruiter is satisfied.

The notification unit 82 (for example, the notification unit 7) notifies the recruiter of the applicant identified by the applicant identification unit 81.

According to this configuration, applicants are identified by using a threshold image set for use in discriminating minimum criteria for determining whether a recruiter is satisfied. Therefore, it is possible to identify, with a high degree of precision, applicants who fulfill recruiter's requirements. Moreover, the configuration enables the applicants who fulfill the recruiter's requirements to some extent, if any, to be introduced to the recruiter even if the applicants are not first choice persons for the recruiter, thereby preventing a reduction in the number of applicants to be introduced to the recruiter.

Further, in the above exemplary embodiments, there is disclosed a configuration including a threshold image set determination unit (for example, the boundary learning unit 4) that determines the threshold image set on the basis of a result of the determination made by the recruiter on whether a sample image set prepared as samples fulfill the recruiter's requirements.

Further, in the above exemplary embodiments, there is disclosed a configuration wherein the threshold image set determination unit determines the threshold image set by using a machine learning technique of a boundary learning type with the sample image set and the result of the determination made by the recruiter as learning data.

Moreover, in the above exemplary embodiments, there is disclosed a configuration wherein the applicant identification unit 81 calculates a satisfaction level representing to what extent each applicant satisfies or does not satisfy the minimum criteria on the basis of a distance between the threshold image set and the image of the applicant and identifies applicants who satisfy the criteria in terms of satisfaction level.

Further, in the above exemplary embodiments, there is disclosed a configuration having a recruiter's terminal (for example, the recruiter's terminal 25) that includes the threshold image set determination unit and a server that includes the applicant identification unit 81 and the notification unit 82, wherein each recruiter's terminal includes a threshold image set transmission unit (for example, the reference vector set transmission unit 27) that transmits the threshold image set to the server and wherein the notification unit 82 transmits applicants identified by the applicant identification unit 81 to the recruiter's terminal.

Moreover, in the above exemplary embodiments, there is disclosed a configuration having an applicant's terminal, which is the terminal of an applicant, and a server including the applicant identification unit 81 and the notification unit 82, wherein the applicant's terminal transmits the image of the applicant to the server and wherein the notification unit 82 transmits a result of the identification performed by the applicant identification unit to the applicant's terminal.

Further, in the above exemplary embodiments, there is disclosed a configuration wherein the applicant identification unit identifies, for each recruiter-cum-applicant, other recruiters-cum-applicants who satisfy the minimum criteria corresponding to the recruiter-cum-applicant and includes a mutual agreement pair identification unit that identifies a pair of recruiters-cum-applicants who mutually satisfy the minimum criteria of the counterpart.

In that configuration, it is possible to identify, with a high degree of precision, persons who fulfill the requirements of each recruiter-cum-applicant. In addition, it is possible to identify a pair of recruiters-cum-applicants who mutually satisfy the requirements of the counterpart. Moreover, a large number of pairs as described above are able to be identified.

Further, in the above exemplary embodiments, there is disclosed a configuration wherein the notification unit 82 notifies only the recruiters-cum-applicants constituting the pair identified by the mutual agreement pair identification unit of the respective counterpart recruiters-cum-applicants.

According to the configuration, there is an advantageous effect for each recruiter-cum-applicant such as not being introduced to other recruiters-cum-applicants who do not fulfill the requirements of the recruiter-cum-applicant.

Moreover, in the above exemplary embodiments, there is disclosed a configuration wherein the applicant identification unit 81 calculates a satisfaction level representing to what extent each applicant satisfies or does not satisfy the minimum criteria on the basis of the distance between the threshold image set and the image of the applicant and identifies applicants who satisfy the criteria in terms of satisfaction level and wherein, in the case where there is established a relationship in which one recruiter-cum-applicant and a plurality of other recruiters-cum-applicants mutually satisfy the criteria of the counterpart, the mutual agreement pair identification unit identifies a recruiter-cum-applicant having the highest satisfaction level among satisfaction levels calculated for each of the plurality of other recruiters-cum-applicants with respect to one recruiter-cum-applicant and identifies a pair of the recruiter-cum-applicant and one recruiter-cum-applicant as a pair of recruiters-cum-applicants.

Further, in the above exemplary embodiments, there is disclosed a configuration wherein the applicant identification unit 81 narrows down applicants who satisfy the conditions of the recruiter in terms of attribute information and decides whether the applicants narrowed down satisfy the minimum criteria corresponding to the recruiter.

According to the configuration, it is possible to reduce the processing load on a process of identifying applicants to a low level.

Figure 12:
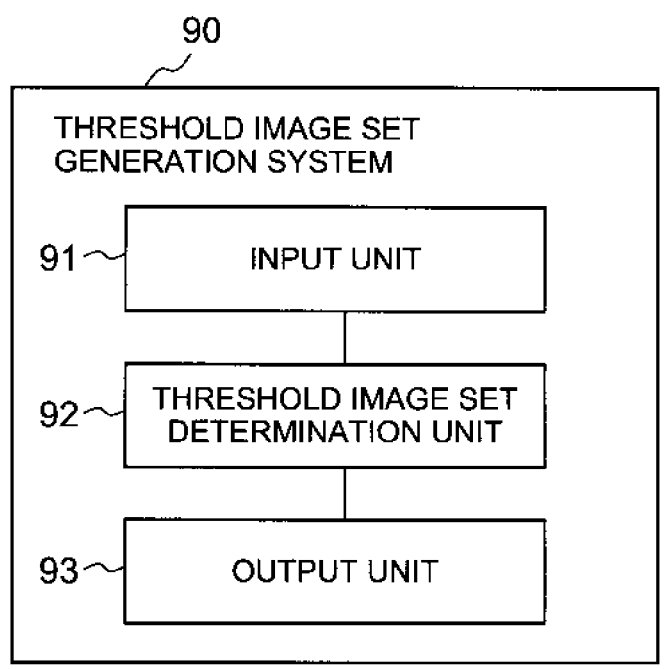
[FIG. 12] It depicts a block diagram illustrating the outline of the threshold image set generation system according to the present invention.

FIG. 12 is a block diagram illustrating the outline of the threshold image set generation system according to the present invention. A threshold image set generation system 90 according to the present invention includes an input unit 91, a threshold image set determination unit 92, and an output unit 93. The input unit 91 receives an input of a result of a determination made by the recruiter on whether a sample image set, which is prepared as samples, satisfies the requirements. The threshold image set determination unit 92 determines a threshold image set for use in discriminating the minimum criteria for determining whether the recruiter is satisfied on the basis of the result of the determination. The output unit 93 outputs the threshold image set. The threshold image set generation system enables a determination of the threshold image set for use in discriminating, with a high degree of precision, applicants who fulfill the recruiter's requirements.

Figure 13:
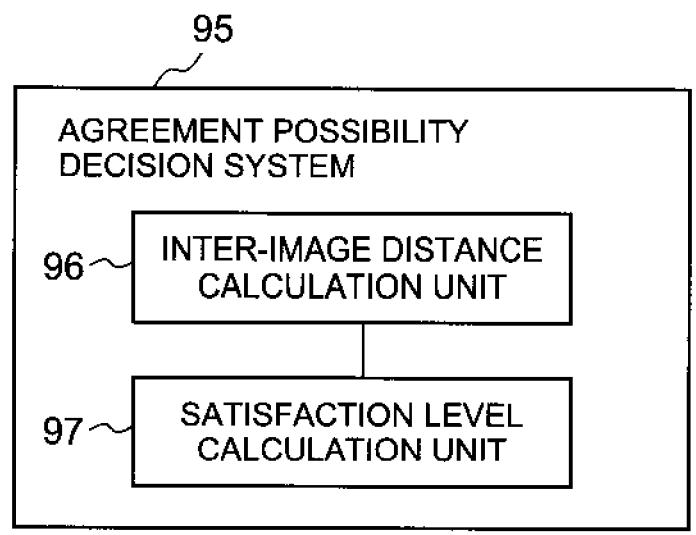
[FIG. 13] It depicts a block diagram illustrating the outline of the agreement possibility decision system according to the present invention.

FIG. 13 is a block diagram illustrating the outline of the agreement possibility decision system according to the present invention. The agreement possibility decision system 95 according to the present invention includes an inter-image distance calculation unit 96 and a satisfaction level calculation unit 97. The inter-image distance calculation unit 96 calculates a distance between each image belonging to the threshold image set for use in discriminating the minimum criteria for determining whether the recruiter is satisfied and the image of an applicant. The satisfaction level calculation unit 97 calculates a satisfaction level representing to what extent the applicant satisfies or does not satisfy the minimum criteria on the basis of the distance. The agreement possibility decision system enables a decision on the possibility of agreement between the recruiter and the applicant.

In the above exemplary embodiment, there are disclosed the features of the introduction system as in the following (1) to (11), the features of the threshold image set generation system as in the following (12) and (13), and the features of the agreement possibility decision system as in the following (14) to (16).

(1) An introduction system of the present invention includes an applicant identification section (for example, the satisfaction level calculation unit 6) that identifies applicants who satisfy minimum criteria on the basis of images input by applicants and a threshold image set (for example, a reference vector set) for use in discriminating the minimum criteria for determining whether a recruiter is satisfied and a notification section (for example, the notification unit 7) that notifies the recruiter of the applicants identified by the applicant identification section.

(2) The introduction system may include a threshold image set determination section (for example, the boundary learning unit 4) that determines the threshold image set on the basis of a result of a determination made by the recruiter on whether a sample image set prepared as samples fulfill the recruiter's requirements.

(3) The threshold image set determination section may determine the threshold image set by using a machine learning technique of a boundary learning type with the sample image set and the result of the determination made by the recruiter as learning data.

(4) The applicant identification section may calculate a satisfaction level representing to what extent each applicant satisfies or does not satisfy the minimum criteria on the basis of a distance between the threshold image set and the image of the applicant and may identify applicants who satisfy the criteria in terms of satisfaction level.

(5) The introduction system may have a recruiter's terminal (for example, the recruiter's terminal 25) that includes the threshold image set determination section and a server that includes the applicant identification section and the notification section, wherein each recruiter's terminal includes a threshold image set transmission section (for example, the reference vector set transmission unit 27) that transmits the threshold image set to the server and wherein the notification section transmits the applicants identified by the applicant identification section to the recruiter's terminal.

(6) The introduction system may have an applicant's terminal, which is the terminal of an applicant, and a server including the applicant identification section and the notification section, wherein the applicant's terminal transmits the image of the applicant to the server and wherein the notification section transmits a result of the identification performed by the applicant identification section to the applicant's terminal.

(7) The applicant identification section may identify, for each recruiter-cum-applicant, other recruiters-cum-applicants who satisfy the minimum criteria corresponding to the recruiter-cum-applicant and may include a mutual agreement pair identification section that identifies a pair of recruiters-cum-applicants who mutually satisfy the minimum criteria of the counterpart.

(8) The notification section may notify only the recruiters-cum-applicants constituting the pair identified by the mutual agreement pair identification section of the respective counterpart recruiters-cum-applicants.

(9) The applicant identification section may calculate a satisfaction level representing to what extent each applicant satisfies or does not satisfy the minimum criteria on the basis of the distance between the threshold image set and the image of the applicant and may identify applicants who satisfy the criteria in terms of satisfaction level and wherein, in the case where there is established a relationship in which one recruiter-cum-applicant and a plurality of other recruiters-cum-applicants mutually satisfy the criteria of the counterpart, the mutual agreement pair identification section may identify a recruiter-cum-applicant having the highest satisfaction level among satisfaction levels calculated for each of the plurality of other recruiters-cum-applicants with respect to one recruiter-cum-applicant and may identify a pair of the recruiter-cum-applicant and one recruiter-cum-applicant as a pair of recruiters-cum-applicants.

(10) The applicant identification section may narrow down applicants who satisfy the conditions of the recruiter in terms of attribute information and may decide whether the applicants narrowed down satisfy the minimum criteria corresponding to the recruiter.

(11) An introduction system according to the present invention includes an applicant identification unit that identifies applicants who satisfy minimum criteria on the basis of images input by applicants and a threshold image set for use in discriminating the minimum criteria for determining whether a recruiter is satisfied and a notification unit that notifies the recruiter of the applicants identified by the applicant identification unit.

(12) A threshold image set generation system according to the present invention includes an input section that receives an input of a result of a determination made by a recruiter on whether a sample image set prepared as samples fulfills recruiter's requirements, a threshold image set determination section that determines a threshold image set for use in discriminating minimum criteria for determining whether the recruiter is satisfied on the basis of the result of the determination, and an output section that outputs the threshold image set.

(13) Further, the threshold image set generation system according to the present invention includes an input unit that receives an input of a result of a determination made by a recruiter on whether a sample image set prepared as samples fulfills recruiter's requirements, a threshold image set determination unit that determines a threshold image set for use in discriminating minimum criteria for determining whether the recruiter is satisfied on the basis of the result of the determination, and an output unit that outputs the threshold image set.

(14) Further, an agreement possibility decision system according to the present invention includes an inter-image distance calculation section that calculates a distance between each image belonging to a threshold image set for use in discriminating minimum criteria for determining whether a recruiter is satisfied and the image of an applicant and a satisfaction level calculation section that calculates a satisfaction level representing to what extent the applicant satisfies or does not satisfy the minimum criteria on the basis of the distance.

(15) The agreement possibility decision system may include a decision section that decides whether the satisfaction level calculated by the satisfaction level calculation section satisfies the criteria.

(16) Further, the agreement possibility decision system according to the present invention includes an inter-image distance calculation unit that calculates a distance between each image belonging to a threshold image set for use in discriminating minimum criteria for determining whether a recruiter is satisfied and the image of an applicant and a satisfaction level calculation unit that calculates a satisfaction level representing to what extent the applicant satisfies or does not satisfy the minimum criteria on the basis of the distance.

Although the present invention has been described with reference to the exemplary embodiments hereinabove, it is understood that the present invention is not limited to the above exemplary embodiments, and various changes and modifications may be made in the configuration or details of the present invention as will be understood by those skilled in the art within the scope of the present invention.

This application claims the right of priority based on Japanese Patent Application No. 2008-306630, filed on Dec. 1, 2008, which is herein incorporated in its entirety by reference.

Industrial Applicability

The present invention is preferably applied to an introduction system that identifies applicants who fulfill recruiter's requirements and introduces the applicants to the recruiter.

Reference Signs List
2 Sample image storage unit
3 Recruiter information registration unit
4 Boundary learning unit
6 Satisfaction level calculation unit
7 Notification unit
8 Recruiter and applicant information storage unit
9 Applicant information registration unit
10 Mutual agreement decision unit

The invention claimed is:

1. An introduction system comprising:
an applicant identification unit that identifies applicants who satisfy minimum criteria on the basis of images input by applicants and a threshold image set for use in discriminating the minimum criteria for determining whether the recruiter is satisfied;
a notification unit that notifies the recruiter of the applicants identified by the applicant identification unit; and
a threshold image set determination unit that determines the threshold image set on the basis of a result of a determination made by the recruiter on whether a sample image set prepared as samples fulfill recruiter's requirements,
wherein the threshold image set determination unit determines the threshold image set by using a machine learning technique of a boundary learning type with the sample image set and the result of the determination made by the recruiter as learning data.

2. The introduction system according to claim 1, wherein the applicant identification unit calculates a satisfaction level representing to what extent each applicant satisfies or does not satisfy the minimum criteria on the basis of a distance between the threshold image set and the image of the applicant and identifies applicants who satisfy the criteria in terms of satisfaction level.

3. The introduction system according to claim 1, having a recruiter's terminal that includes the threshold image set determination unit and a server that includes the applicant identification unit and the notification unit, wherein:
each recruiter's terminal includes a threshold image set transmission unit that transmits the threshold image set to the server; and
the notification unit transmits the applicants identified by the applicant identification unit to the recruiter's terminal.

4. The introduction system according to claim 1, having an applicant's terminal, which is the terminal of an applicant, and a server including the applicant identification unit and the notification unit, wherein:
the applicant's terminal transmits the image of the applicant to the server; and
the notification unit transmits a result of the identification performed by the applicant identification unit to the applicant's terminal.

5. The introduction system according to claim 1, wherein the applicant identification unit identifies, for each recruiter-cum-applicant, other recruiters-cum-applicants who satisfy the minimum criteria corresponding to the recruiter-cum-applicant and includes a mutual agreement pair identification unit that identifies a pair of recruiters-cum-applicants who mutually satisfy the minimum criteria of the counterpart.

6. The introduction system according to claim 5, wherein the notification unit notifies only the recruiters-cum-applicants constituting the pair identified by the mutual agreement pair identification unit of the respective counterpart recruiters-cum-applicants.

7. The introduction system according to claim 5, wherein:
the applicant identification unit calculates a satisfaction level representing to what extent each applicant satisfies or does not satisfy the minimum criteria on the basis of the distance between the threshold image set and the image of the applicant and identifies applicants who satisfy the criteria in terms of satisfaction level; and
in the case where there is established a relationship in which one recruiter-cum-applicant and a plurality of other recruiters-cum-applicants mutually satisfy the criteria of the counterpart, the mutual agreement pair identification unit identifies a recruiter-cum-applicant having the highest satisfaction level among satisfaction levels calculated for each of the plurality of other recruiters-cum-applicants with respect to one recruiter-cum-applicant and identifies a pair of the recruiter-cum-applicant and one recruiter-cum-applicant as a pair of recruiters-cum-applicants.

8. The introduction system according to claim 1, wherein the applicant identification unit narrows down applicants who satisfy the conditions of the recruiter in terms of attribute information and decides whether the applicants narrowed down satisfy the minimum criteria corresponding to the recruiter.

9. A threshold image set generation system comprising:
an input unit that receives an input of a result of a determination made by a recruiter on whether a sample image set prepared as samples fulfills recruiter's requirements;
a threshold image set determination unit that determines a threshold image set for use in discriminating minimum criteria for determining whether the recruiter is satisfied on the basis of the result of the determination; and
an output unit that outputs the threshold image set,
wherein the threshold image set determination unit determines the threshold image set by using a machine learning technique of a boundary learning type with the sample image set and the result of the determination made by the recruiter as learning data.

10. An agreement possibility decision system comprising:
an inter-image distance calculation unit that calculates a distance between each image belonging to a threshold image set for use in discriminating minimum criteria for determining whether a recruiter is satisfied and the image of an applicant;
a satisfaction level calculation unit that calculates a satisfaction level representing to what extent the applicant satisfies or does not satisfy the minimum criteria on the basis of the distance; and
a threshold image set determination unit that determines the threshold image set on the basis of a result of a determination made by the recruiter on whether a sample image set prepared as samples fulfill recruiter's requirements,
wherein the threshold image set determination unit determines the threshold image set by using a machine learning technique of a boundary learning type with the sample image set and the result of the determination made by the recruiter as learning data.

11. The agreement possibility decision system according to claim 10, further comprising a decision unit that decides whether the satisfaction level calculated by the satisfaction level calculation unit satisfies the criteria.

12. A method of introduction comprising:
    identifying applicants who satisfy minimum criteria on the basis of images input by applicants and a threshold image set for use in discriminating the minimum criteria for determining whether a recruiter is satisfied;
    notifying the recruiter of the identified applicants: and
    determining the threshold image set on the basis of a result of a determination made by the recruiter on whether a sample image set prepared as samples fulfill recruiter's requirements,
    wherein the threshold image set is determined by using a machine learning technique of a boundary learning type with the sample image set and the result of the determination made by the recruiter as learning data.

13. A non-transitory computer readable information recording medium storing an introduction program which, when executed by a processor, performs a method comprising:
    identifying applicants who satisfy minimum criteria on the basis of images input by applicants and a threshold image set for use in discriminating the minimum criteria for determining whether a recruiter is satisfied;
    notifying the recruiter of the applicants identified in the applicant identification process; and
    determining the threshold image set on the basis of a result of a determination made by the recruiter on whether a sample image set prepared as samples fulfill recruiter's requirements,
    wherein the threshold image set is determined by using a machine learning technique of a boundary learning type with the sample image set and the result of the determination made by the recruiter as learning data.

14. A non-transitory computer readable information recording medium storing a threshold image set generation program which, when executed by a processor, performs a method comprising:
    receiving an input of a result of a determination made by a recruiter on whether a sample image set prepared as samples fulfills recruiter's requirements;
    determining a threshold image set for use in discriminating minimum criteria for determining whether the recruiter is satisfied on the basis of the result of the determination; and
    outputting the threshold image set,
    wherein the threshold image set is determined using a machine learning technique of a boundary learning type with the sample image set and the result of the determination made by the recruiter as learning data.

15. A non-transitory computer readable information recording medium storing an agreement possibility decision program which, when executed by a processor, performs a method comprising:
    calculating a distance between each image belonging to a threshold image set for use in discriminating minimum criteria for determining whether a recruiter is satisfied and the image of an applicant;
    calculating a satisfaction level representing to what extent the applicant satisfies or does not satisfy the minimum criteria on the basis of the distance;
    determining the threshold image set on the basis of a result of a determination made by the recruiter on whether a sample image set prepared as samples fulfill recruiter's requirements,
    wherein the threshold image set is determined by using a machine learning technique of a boundary learning type with the sample image set and the result of the determination made by the recruiter as learning data.

* * * * *